United States Patent
Martinez et al.

(10) Patent No.: US 10,811,192 B2
(45) Date of Patent: Oct. 20, 2020

(54) RELIABLE CAPACITOR STRUCTURES

(71) Applicant: Apple Inc., Cupertino, CA (US)

(72) Inventors: Paul A. Martinez, Morgan Hill, CA (US); Won Seop Choi, Pleasanton, CA (US); Gang Ning, Santa Clara, CA (US); Chirag V. Shah, Milpitas, CA (US); Martin Schauer, Fremont, CA (US); Curtis C. Mead, Sacramento, CA (US); Ming Yuan Tsai, San Jose, CA (US); Albert Wang, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/146,042

(22) Filed: Sep. 28, 2018

(65) Prior Publication Data
US 2020/0105473 A1    Apr. 2, 2020

(51) Int. Cl.
H01G 4/005 (2006.01)
H01G 4/12 (2006.01)
H01G 4/228 (2006.01)
H01G 4/30 (2006.01)

(52) U.S. Cl.
CPC .............. *H01G 4/30* (2013.01); *H01G 4/005* (2013.01); *H01G 4/12* (2013.01); *H01G 4/228* (2013.01)

(58) Field of Classification Search
CPC ......... A62C 31/22; A62C 31/02; A62C 33/04; E06B 5/162; E06B 5/16; F16L 5/04; H01G 4/005; H01G 4/0085; H01G 4/012; H01G 4/10; H01G 4/12; H01G 4/224; H01G 4/228; H01G 4/232; H01G 4/30; H01G 4/1218; H01G 4/38; H01G 4/1209; H01G 4/248; H05K 1/18; H05K 1/111; H05K 1/181; H05K 3/341; H05K 3/3442
USPC ........................... 361/301.4, 321.2; 174/260
See application file for complete search history.

(56) References Cited

U.S. PATENT DOCUMENTS

| | | | |
|---|---|---|---|
| 8,456,799 | B2 | 6/2013 | Chang et al. |
| 8,804,367 | B2 | 8/2014 | Park et al. |
| 9,330,849 | B2 | 5/2016 | Gong et al. |
| 9,672,986 | B2 | 6/2017 | Koller et al. |
| 9,812,259 | B2 | 11/2017 | Lee et al. |
| 9,922,768 | B2 | 3/2018 | Kitano et al. |
| 2004/0229746 | A1* | 11/2004 | Park ..................... H01G 4/1227 501/139 |
| 2010/0097739 | A1 | 4/2010 | Prymak |

(Continued)

FOREIGN PATENT DOCUMENTS

| | | |
|---|---|---|
| JP | 2012182355 A | 9/2012 |
| JP | 2013021010 A | 1/2013 |

*Primary Examiner* — Timothy J Thompson
*Assistant Examiner* — Guillermo J Egoavil
(74) *Attorney, Agent, or Firm* — Fletcher Yoder, P.C.

(57) ABSTRACT

Multilayer ceramic capacitor structures may include structural arrangements, materials, and/or substrate modifications that can improve the reliability of the capacitor for long-term usage when faced with environmental stress. Embodiments may implement reduced entryways in the termination patterns of the capacitor to decrease damage potential due to exposure of moisture. Embodiments may implement structures that decrease interfaces with different physical characteristics, which may lead to a reduction in the formation of micro-fractures during regular usage. Methods of manufacture for the features that improve reliability are also detailed.

20 Claims, 19 Drawing Sheets

(56) References Cited

U.S. PATENT DOCUMENTS

| | | | |
|---|---|---|---|
| 2015/0016014 A1* | 1/2015 | Park | H01G 2/065 |
| | | | 361/301.4 |
| 2015/0049413 A1* | 2/2015 | Wada | H01G 4/224 |
| | | | 361/301.4 |
| 2016/0351330 A1 | 12/2016 | Gong et al. | |
| 2017/0084395 A1* | 3/2017 | Martinez | H01G 4/232 |
| 2017/0213647 A1* | 7/2017 | Ahn | H05K 1/111 |

* cited by examiner

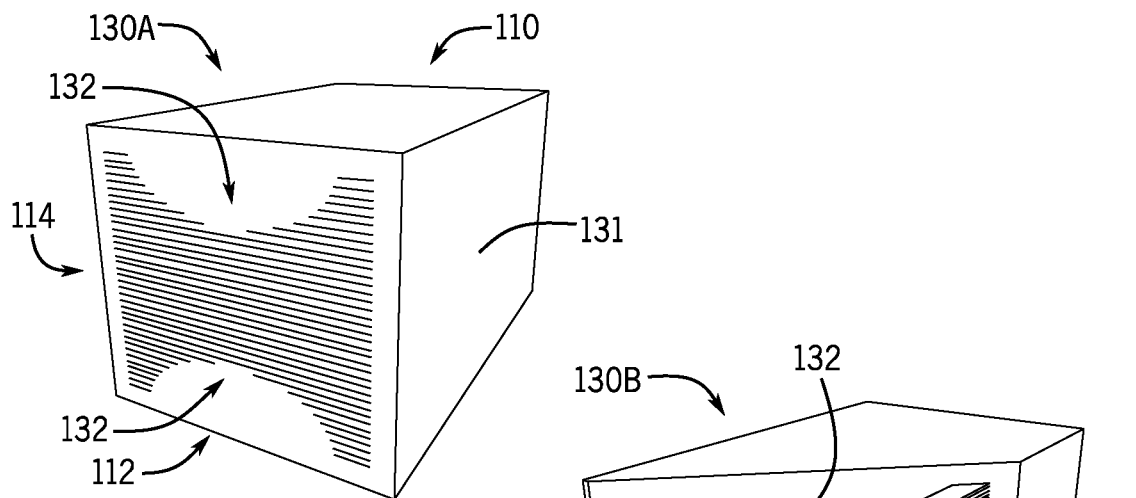
FIG. 8A
FIG. 8B
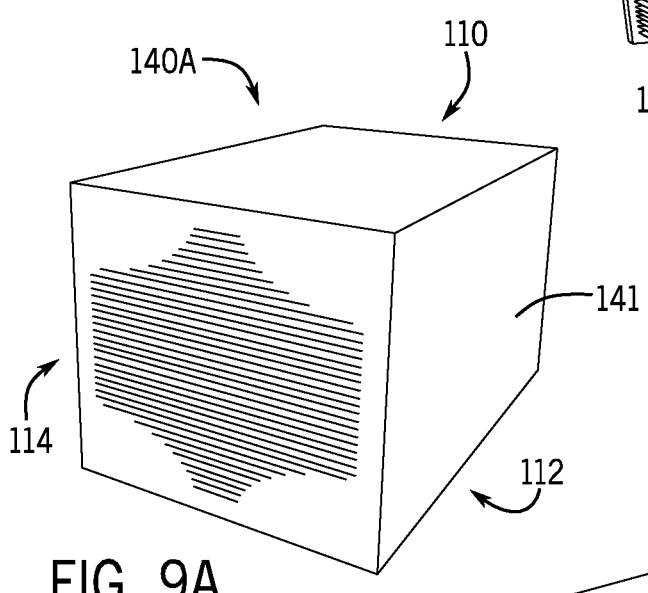
FIG. 9A
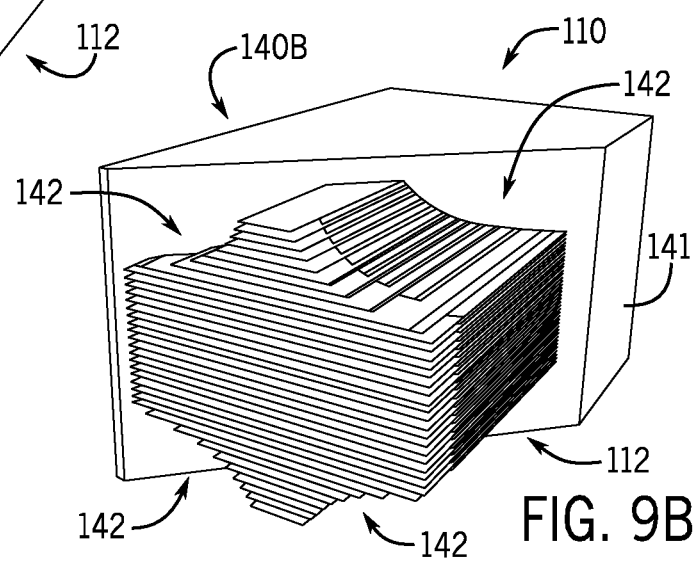
FIG. 9B

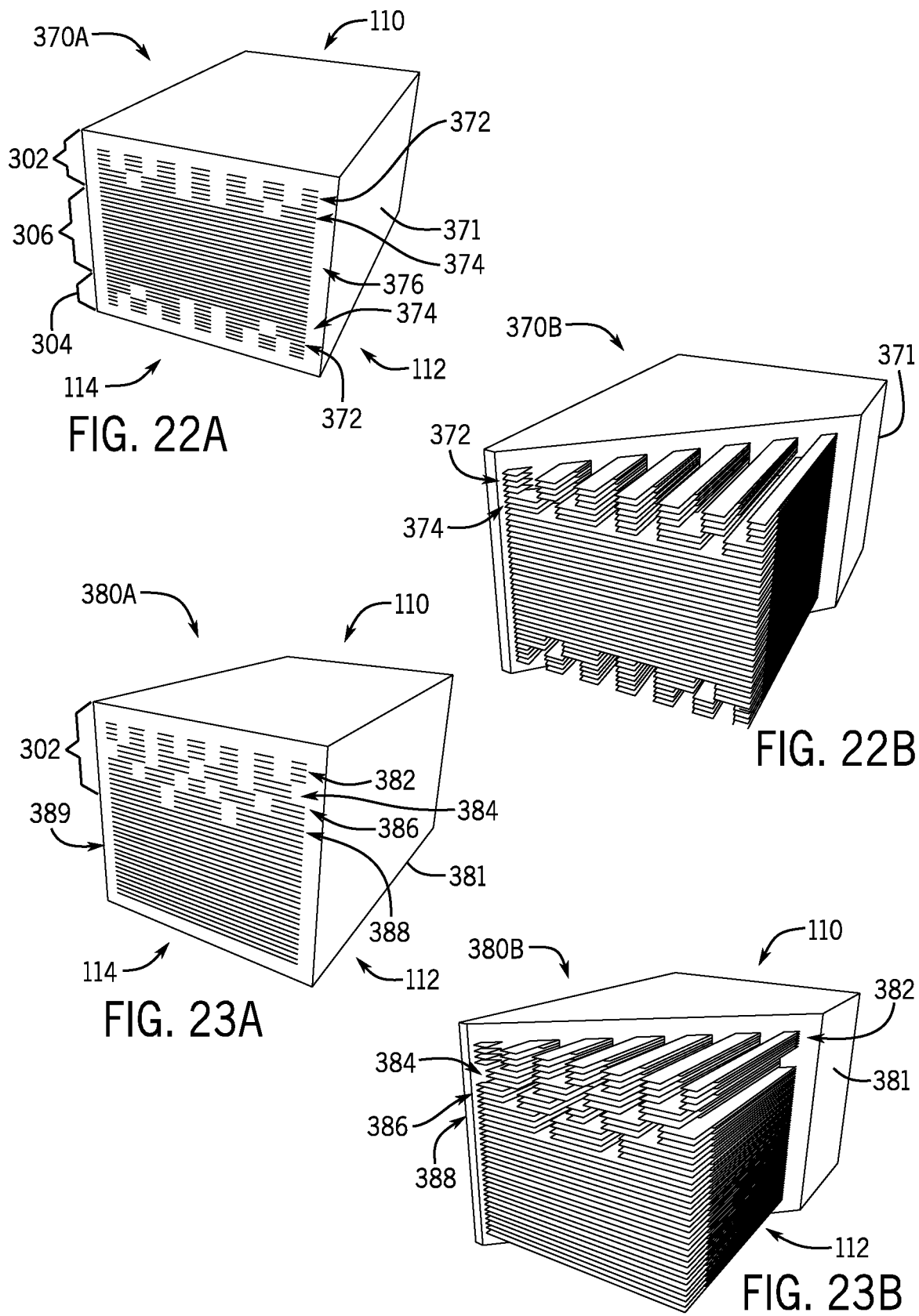

RELIABLE CAPACITOR STRUCTURES

BACKGROUND

The present disclosure relates generally to capacitor structures, and more particularly, to multilayer ceramic capacitor structures that implement structures and/or materials that improve reliability of the capacitor structures by mitigating damage due to environmental exposure.

This section is intended to introduce the reader to various aspects of art that may be related to various aspects of the present disclosure, which are described or claimed below. This discussion is believed to be helpful in providing the reader with background information to facilitate a better understanding of the various aspects of the present disclosure. Accordingly, it should be understood that these statements are to be read in this light, and not as admissions of prior art.

Many electronic devices include electronic circuits that employ capacitors for filtering, impedance matching, energy storage, and other applications. Ceramic capacitors have been used in compact electrical devices, as the reduced dimensions allow smaller circuit board footprints. Due to the plasticity of the material and the high permittivity of the dielectric, ceramic capacitors may be produced in very compact and customized dimensions and shapes. For example, multilayer ceramic capacitors, i.e., ceramic capacitors having multiple electrode layers forming a capacitor structure, may be used to obtain high capacitances in a compact package.

Ceramic capacitors may be susceptible to environmental damage that may decrease reliability of the capacitor over time. As an example, thermal variations may create micro fractures in the body of the capacitor, which may lead to changes in the nominal capacitance and may, eventually, cause failure of the capacitor. The variations in the nominal capacitance or failures of the capacitor may eventually lead to premature failure of the electronic device.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Under normal usage, capacitors may suffer micro fractures due to stress. The micro fractures may lead to exposure of metallization to environmental moisture, which may lead to premature damage to the capacitor. Embodiments described herein include capacitor structures that may have reduced exposed metallization in the termination surface. These reduced moisture entryways may be implemented by the implementation of cut-away regions, e.g., regions on the termination surface without the presence of exposed metallization. Embodiments described herein also include capacitor structures that implement a metallization density gradient that generates a soft gradient in physical characteristics of the material. Embodiments described herein may also implement different materials in non-metallized regions of the capacitor structure. These materials may present physical characteristics that substantially match the physical characteristics of the metallized region. The soft gradient and/or the matched physical characteristics may reduce the formation of micro fractures due to stress.

In an embodiment, a multilayer ceramic capacitor is described. The multilayer ceramic capacitor may have a lid and a floor region that include ceramic layers formed from a first ceramic material, and a middle region that includes ceramic layers formed from a second ceramic material, different from the first ceramic material. The ceramic layers of the middle region may include an electrode region.

In another embodiment, a multilayer ceramic capacitor is described. The multilayer ceramic capacitor may have ceramic layers having electrodes. A termination surface of the multilayer capacitors, which may be a surface that receives a terminal of the capacitor, may have a termination pattern formed by the exposed terminations of the electrodes of the ceramic layers. The termination pattern may include a cutaway region along the top of the multilayer capacitor device.

In another embodiment, a multilayer ceramic capacitor is described. The multilayer ceramic capacitor may have a first group of ceramic layers, with electrodes, and a second group of ceramic layers. The multilayer ceramic capacitor may be formed by stacking layers of the first group of ceramic layers and layers of the second group of ceramic layers to create a gradient of metallization density from the top towards the middle of the capacitor.

Embodiments of methods for production for capacitor structures are also described herein. In some embodiments of the method of production, processes for treating the non-metallized regions of the capacitor to change physical characteristics are described. In some embodiments of the method of production, processes for stacking ceramic layers to produce metallization gradient are described. In some embodiments, processes for stenciling ceramic layers that, when pressed, create a particular termination pattern are described. The processes described herein may be generally combined with methods of production of multilayer ceramic capacitors to introduce one or more of the features that improve reliability that are described herein.

BRIEF DESCRIPTION OF THE DRAWINGS

Various aspects of this disclosure may be better understood upon reading the following detailed description and upon reference to the drawings in which:

FIG. 8A is a perspective view of a MLCC with a chalice-shaped termination pattern, in accordance with an embodiment;

FIG. 8B is a cross-section perspective view of the MLCC of FIG. 8A that illustrates its electrode disposition, in accordance with an embodiment;

FIG. 9A is a perspective view of a MLCC with a rounded cross-shaped termination pattern, in accordance with an embodiment;

FIG. 9B is a cross-section perspective view of the MLCC of FIG. 9A that illustrates its electrode disposition, in accordance with an embodiment;

FIG. 22A is a perspective view of a MLCC with crenelated electrodes in a lid and floor region of the capacitor, in accordance with an embodiment;

FIG. 22B is a cross-section perspective view of the MLCC of FIG. 22A that illustrates its electrode disposition, in accordance with an embodiment;

FIG. 23A is a perspective view of a MLCC with crenelated electrodes in a lid region of the capacitor, in accordance with an embodiment;

FIG. 23B is a cross-section perspective view of the MLCC of FIG. 23A that illustrates its electrode disposition, in accordance with an embodiment;

DETAILED DESCRIPTION OF SPECIFIC EMBODIMENTS

Figure 1:
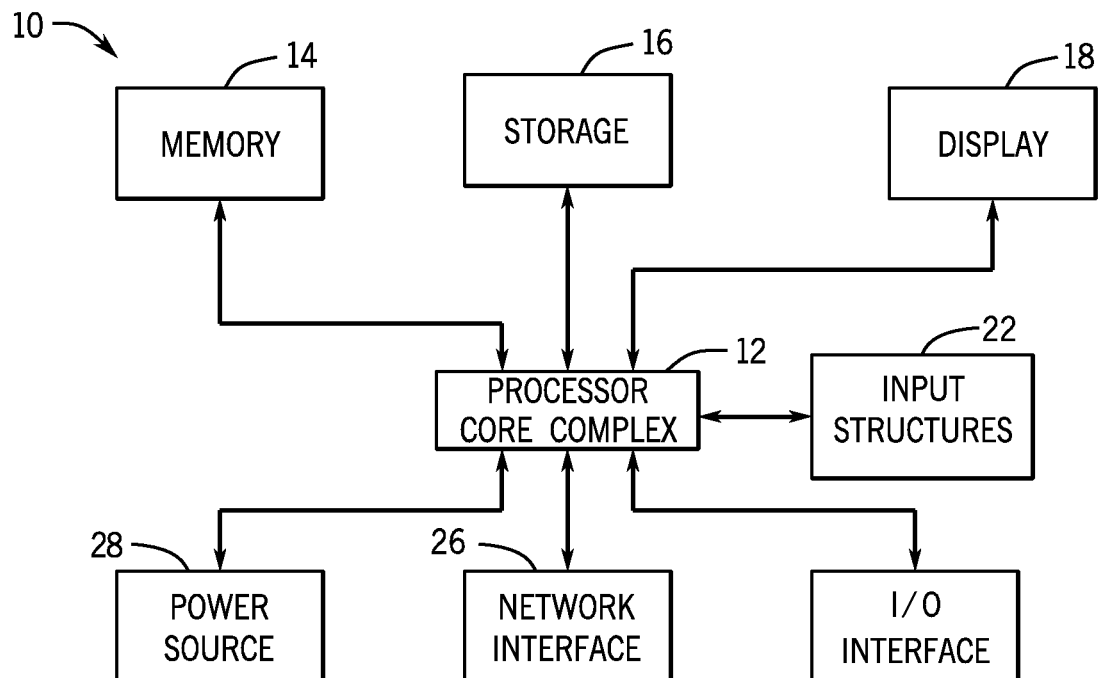
FIG. 1 is a schematic block diagram of an electronic device that may benefit from the inclusion of one or more reliable capacitor structures, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Many electronic devices may employ capacitors for energy storage, tuning, impedance matching, noise filtering, and other functionalities. One such type of capacitor is the group of ceramic multilayer ceramic capacitor (MLCC) devices, e.g., capacitor devices that may be formed by multiple layers of ceramic sheets with stenciled or bonded electrode layers. Due to the distribution of electrode layers within the MLCC device, the distribution of certain material properties, such as thermal expansion coefficient, thermal capacity, piezoelectric coefficient, or rigidity, may be inhomogeneous through the capacitor body. As an example, regions with a high metal density, such as in the center of the MLCC device, may have a higher thermal coefficient when compared with regions with a lower metal density, such as in the periphery of the MLCC device.

Stresses associated with these material properties may lead to stress fractures to the MLCC over the course of its lifetime. For example, an MLCC that undergoes variations of temperature may present fractures (e.g., micro fractures) in the interface between regions with different thermal coefficient or thermal coefficient. An MLCC subject to high frequency signals may be subject to piezoelectric vibrations, which may cause stress fractures in the interface between regions with different piezoelectric coefficients or rigidity constants.

To improve the life cycle of electronic devices employing capacitors, the present application discusses capacitor devices that may present improved reliability when faced with potential stress damage. As detailed below, certain embodiments include capacitor structures that may have reduced moisture entryways. Reduced entryways may be implemented by reduction or removal of exposed metallization in regions that may be particularly vulnerable fractures, such as the top and/or the bottom of the capacitor structure. As a result of the reduced exposure of metallization to moisture, potential damage due to oxidative stress may be mitigated.

Other structures described herein may improve reliability by decreasing the amount of damage due to physical stress. Embodiments may include structures that create a soft gradient in the physical characteristics of the body of the capacitor, by reducing the opportunity for the presence of fractures. Softer gradients may be implemented by selective use of ceramic layers with increasing electrode metallization. Softer gradients may also be implemented by including ceramic layers with no metallization between electrode layers. Some embodiments may decrease the gradients in physical characteristics by employing different materials or modifications to materials in regions without metallization, such that the non-metallized regions and the metallized regions may have matched physical characteristics. Also included are embodiments that employ a combination of the features described above. Embodiments of methods for production of the capacitor structures including the above-described features, and embodiments of electronic devices that make use of the more reliable capacitor structures are also included herein.

With the foregoing in mind, a general description of suitable electronic devices that may benefit from the reliable capacitor structures described herein is provided below. Turning first to FIG. 1, an electronic device 10 according to an embodiment of the present disclosure may include, among other things, one or more processor(s) 12, memory 14, nonvolatile storage 16, a display 18, input structures 22, an input/output (I/O) interface 24, a network interface 26, and a power source 28. The various functional blocks shown in FIG. 1 may include hardware elements (including circuitry that may make use of the MLCC embodiments described herein), software elements (including computer code stored on a computer-readable medium) or a combination of both hardware and software elements. It should be noted that FIG. 1 is merely one example of a particular implementation and is intended to illustrate the types of components that may be present in electronic device 10.

Figure 2:
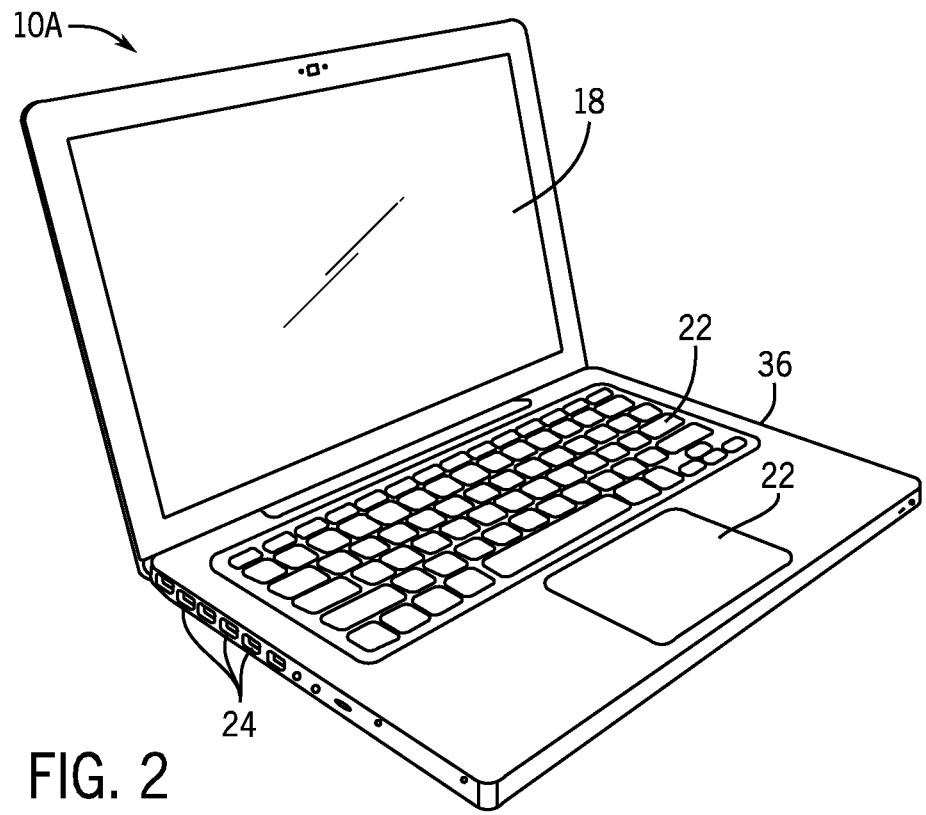
FIG. 2 is a perspective view of a notebook computer representing an embodiment of the electronic device of FIG. 1, in accordance with an embodiment.
Figure 4:
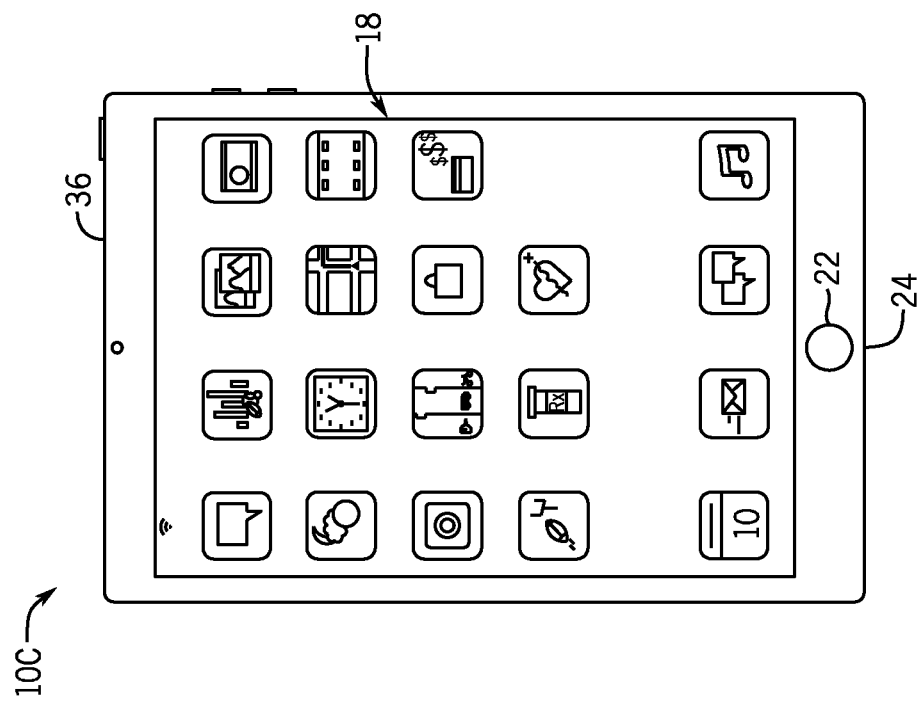
FIG. 4 is a front view of another hand-held device representing another embodiment of the electronic device of FIG. 1, in accordance with an embodiment.
Figure 3:
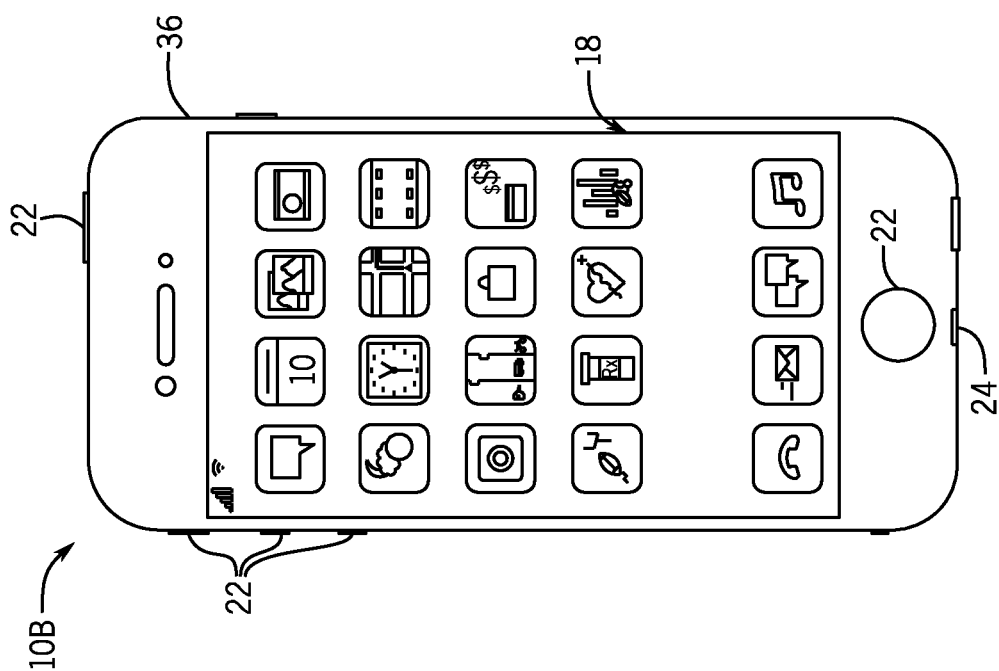
FIG. 3 is a front view of a hand-held device representing another embodiment of the electronic device of FIG. 1, in accordance with an embodiment.
Figure 5:
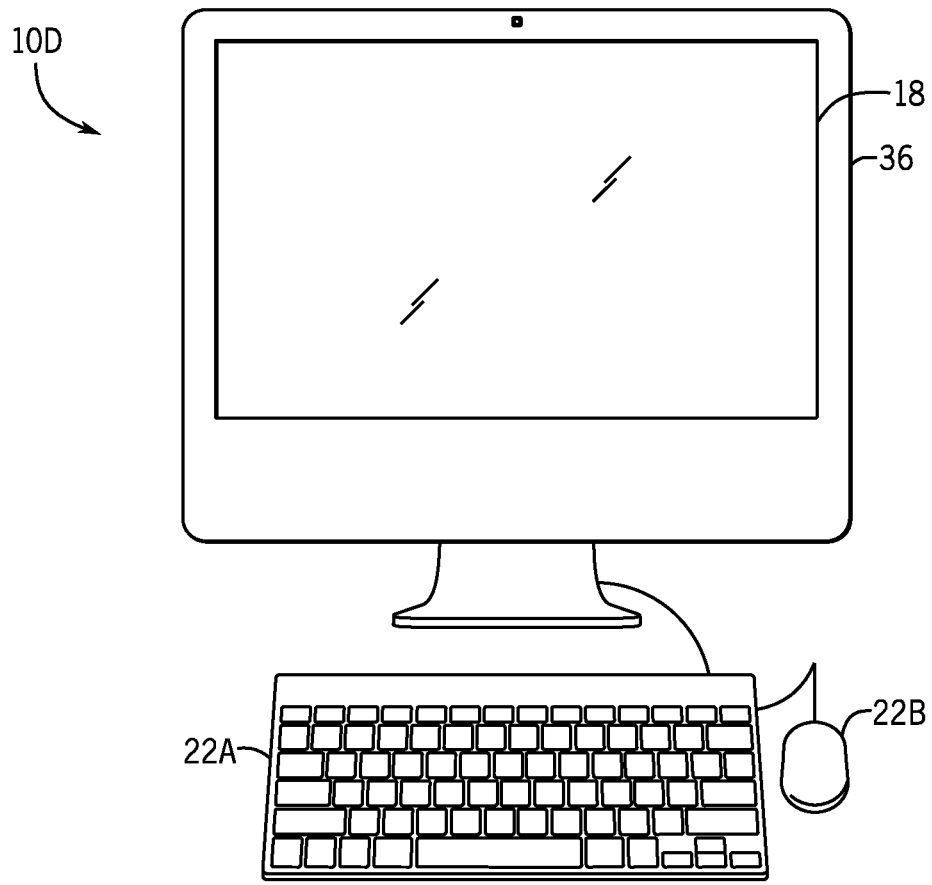
FIG. 5 is a front view of a desktop computer representing another embodiment of the electronic device of FIG. 1, in accordance with an embodiment.
Figure 6:
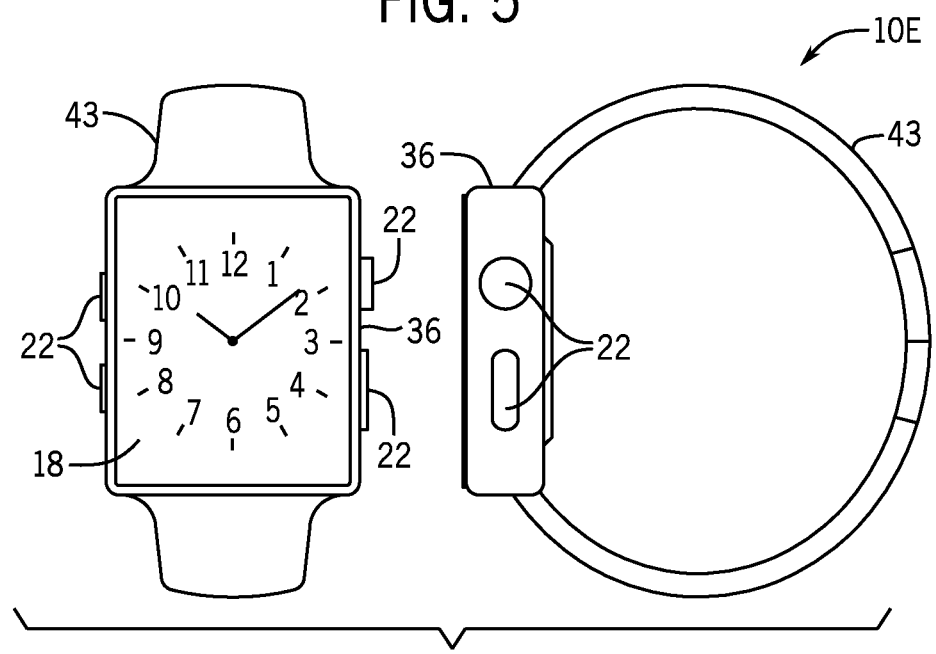
FIG. 6 is a front view and side view of a wearable electronic device representing another embodiment of the electronic device of FIG. 1, in accordance with an embodiment.

By way of example, the electronic device 10 may represent a block diagram of the notebook computer depicted in FIG. 2, the handheld device depicted in FIG. 3, the tablet device depicted in FIG. 4, the desktop computer depicted in FIG. 5, the wearable electronic device depicted in FIG. 6, or similar devices. It should be noted that the processor(s) 12 and other related items in FIG. 1 may be generally referred to herein as "data processing circuitry." Such data processing circuitry may be embodied wholly or in part as software, firmware, hardware, or any combination thereof. Furthermore, the data processing circuitry may be a single contained processing module or may be incorporated wholly or partially within any of the other elements within the electronic device 10.

In the electronic device 10 of FIG. 1, the processor(s) 12 may be operably coupled with the memory 14 and the nonvolatile storage 16 to perform various algorithms. Such programs or instructions executed by the processor(s) 12 may be stored in any suitable article of manufacture that includes one or more tangible, computer-readable media at least collectively storing the instructions or routines, such as the memory 14 and the nonvolatile storage 16. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor(s) 12 to enable the electronic device 10 to provide various functionalities.

In certain embodiments, the display 18 may be a liquid crystal display (LCD). The display 18 may allow users to view images generated on the electronic device 10. In some embodiments, the display 18 may include a touch screen, which may allow users to interact with a user interface of the electronic device 10. Furthermore, it should be appreciated that, in some embodiments, the display 18 may include one or more organic light emitting diode (OLED) displays, or some combination of LCD panels and OLED panels. Display 18 may employ any of the capacitor structure embodiments described herein for filtering, energy storage, or signal integration.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interface 26. The network interface 26 may include, for example, one or more interfaces for a personal area network (PAN), such as a Bluetooth network, for a local area network (LAN) or wireless local area network (WLAN), such as an 802.11x Wi-Fi network, or for a wide area network (WAN), such as a 3rd generation (3G) cellular network, 4th generation (4G) cellular network, long term evolution (LTE) cellular network, or long term evolution license assisted access (LTE-LAA) cellular network.

Network interfaces 26 such as the one described above may benefit from the use of tuning circuitry, impedance matching circuitry, or noise filtering circuits that may include reliable capacitor structures devices such as the ones described herein. As further illustrated, the electronic device 10 may include a power source 28. The power source 28 may include any suitable source of power, such as a rechargeable lithium polymer (Li-poly) battery or an alternating current (AC) power converter. The power source 28 may benefit from the use of any of the capacitor embodiments described herein to provide filtering or energy storage functionalities.

In certain embodiments, the electronic device 10 may take the form of a computer, a portable electronic device, a wearable electronic device, or other type of electronic device. Such computers may include computers that are generally portable (such as laptop, notebook, and tablet computers) as well as computers that are generally used in one place (such as conventional desktop computers, workstations, or servers). In certain embodiments, the electronic device 10 in the form of a computer may be a model of a MacBook®, MacBook® Pro, MacBook Air®, iMac®, Mac® mini, or Mac Pro® available from Apple Inc. By way of example, the electronic device 10, taking the form of a notebook computer 10A, is illustrated in FIG. 2 in accordance with one embodiment of the present disclosure. The depicted computer 10A may include a housing or enclosure 36, a display 18, input structures 22, and ports of an I/O interface 24. In one embodiment, the input structures 22 (such as a keyboard or touchpad) may be used to interact with the computer 10A, such as to start, control, or operate a GUI or applications running on computer 10A. For example, a keyboard or touchpad may allow a user to navigate a user interface or application interface displayed on display 18.

FIG. 3 depicts a front view of a handheld device 10B, which represents one embodiment of the electronic device 10. The handheld device 10B may represent, for example, a portable phone, a media player, a personal data organizer, a handheld game platform, or any combination of such devices. By way of example, the handheld device 10B may be a model of an iPod® or iPhone® available from Apple Inc. of Cupertino, Calif. The handheld device 10B may include an enclosure 36 to protect interior components from physical damage and to shield them from electromagnetic interference. The enclosure 36 may surround the display 18. The I/O interfaces 24 may open through the enclosure 36 and may include, for example, an I/O port for a hard-wired connection for charging or content manipulation using a standard connector and protocol, such as the Lightning connector provided by Apple Inc., a universal serial bus (USB), or other similar connector and protocol.

User input structures 22, in combination with the display 18, may allow a user to control the handheld device 10B. For example, the input structures 22 may activate or deactivate the handheld device 10B, navigate user interface to a home screen, a user-configurable application screen, or activate a voice-recognition feature of the handheld device 10B. Other input structures 22 may provide volume control, or may toggle between vibrate and ring modes. The input structures 22 may also include a microphone may obtain a user's voice for various voice-related features, and a speaker may enable audio playback or certain phone capabilities. The input structures 22 may also include a headphone input may provide a connection to external speakers or headphones.

FIG. 4 depicts a front view of another handheld device 10C, which represents another embodiment of the electronic device 10. The handheld device 10C may represent, for example, a tablet computer, or one of various portable computing devices. By way of example, the handheld device 10C may be a tablet-sized embodiment of the electronic device 10, which may be, for example, a model of an iPad® available from Apple Inc. of Cupertino, Calif.

Turning to FIG. 5, a computer 10D may represent another embodiment of the electronic device 10 of FIG. 1. The computer 10D may be any computer, such as a desktop computer, a server, or a notebook computer, but may also be a standalone media player or video gaming machine. By way of example, the computer 10D may be an iMac®, a MacBook®, or other similar device by Apple Inc. It should be noted that the computer 10D may also represent a personal computer (PC) by another manufacturer. A similar enclosure 36 may be provided to protect and enclose internal components of the computer 10D such as the display 18. In certain embodiments, a user of the computer 10D may interact with the computer 10D using various peripheral input devices, such as the keyboard 22A or mouse 22B (e.g., input structures 22), which may connect to the computer 10D.

Similarly, FIG. 6 depicts a wearable electronic device 10E representing another embodiment of the electronic device 10 of FIG. 1 that may be configured to operate using the techniques described herein. By way of example, the wearable electronic device 10E, which may include a wristband 43, may be an Apple Watch® by Apple, Inc. However, in other embodiments, the wearable electronic device 10E may include any wearable electronic device such as, for example, a wearable exercise monitoring device (e.g., pedometer, accelerometer, heart rate monitor), or other device by another manufacturer. The display 18 of the wearable electronic device 10E may include a touch screen display 18 (e.g., LCD, OLED display, active-matrix organic light emitting diode (AMOLED) display, and so forth), as well as input structures 22, which may allow users to interact with a user interface of the wearable electronic device 10E.

Electronic devices 10A, 10B, 10C, 10D, and 10E described above may all employ the reliable capacitor structures in analog and/or digital circuitry such as in tuning circuits, impedance matching circuits, power decoupling circuits, filtering circuits, amplifiers, power controllers, integrating circuitry, memory, data storage, and any other such circuitry that may employ use a capacitor. The use of the capacitors described herein may improve the electronic devices 10 by improving the lifetime, the thermal tolerance, the moisture tolerance, and/or water resistance of the electronic device 10.

Figure 7A:
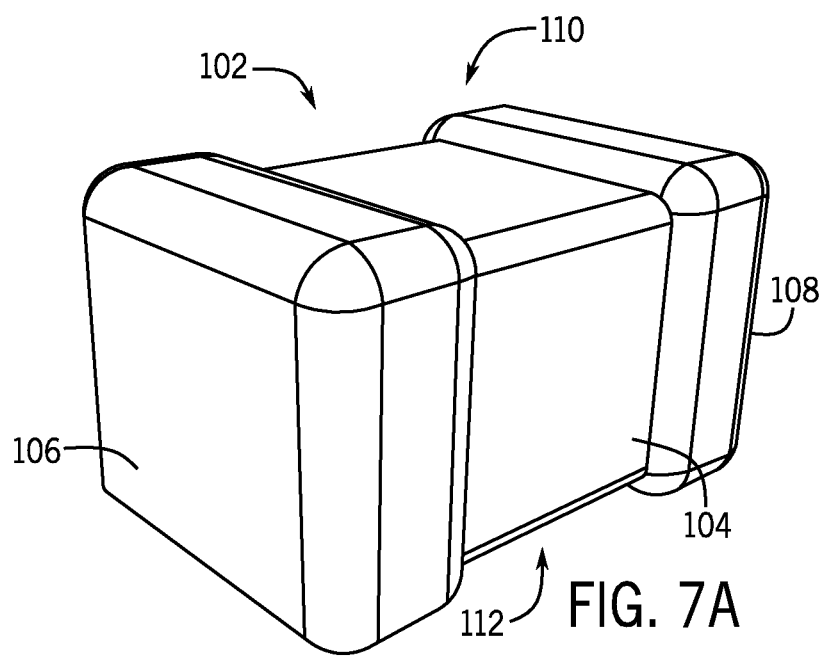
FIG. 7A is a perspective view of a multilayer ceramic capacitor (MLCC), in accordance with an embodiment.

FIG. 7A provides an illustration of an MLCC device 102. The MLCC device 102 may include a body 104, which contains the electrodes and the dielectric layers that provides the capacitance of the MLCC device 102. A first terminal 106 and a second terminal 108, located at two opposite ends of the capacitor, may be used to create electrical coupling between the MLCC device 102 and other circuitry. The illustrated MLCC device 102 may have a top 110 and a bottom 112. When coupled to a flat printed circuit board (PCB), the bottom 112 is the surface of the MLCC device 102 that is the closest to the PCB, and the top 110 is the surface of the MLCC device that is opposite to the bottom 112.

Figure 7B:
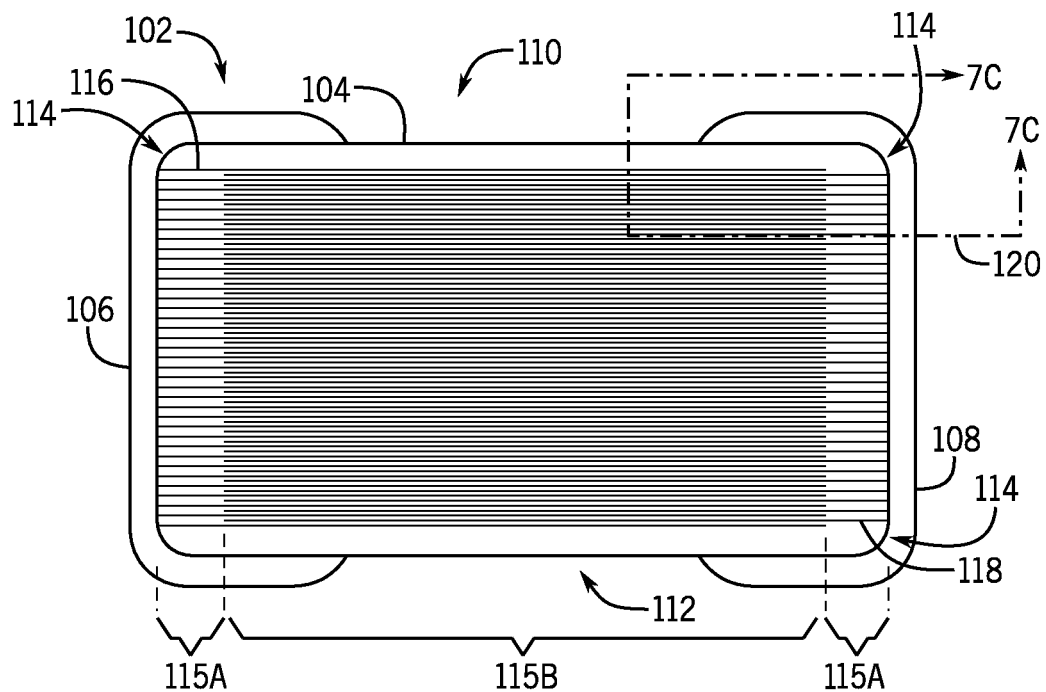
FIG. 7B is a cross-section view of the multilayer ceramic capacitor of FIG. 7A.

FIG. 7B illustrates a cross-section of the MLCC device 102. The cross-section view illustrates a series of electrodes 116 that are coupled to the first terminal 106, and a series of electrodes 118 that are coupled to the second terminal 108. The electrodes 116 and 118 are coupled, respectively, to terminals 106 and 108 through a termination surface 114. As detailed below, the termination surface 114 may be a surface at an end of the body 104 of the MLCC device 102 that has exposed electrode terminations (i.e., terminations of the electrodes 116 or 118) for coupling with the metallization of the terminals 106 or 108. Also illustrated in FIG. 7B are termination regions 115A, and a capacitive region 115B.

Figure 7C:
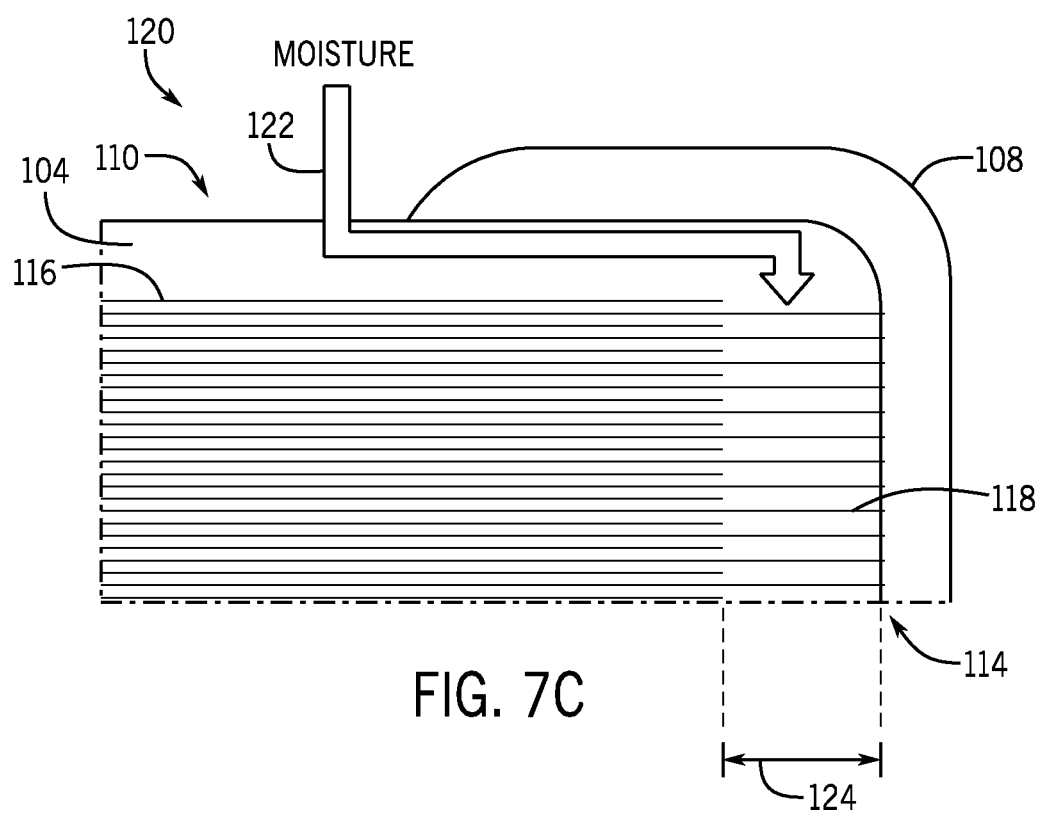
FIG. 7C is a detailed view of a region of the cross-section view of FIG. 7B.

A region 120 in the top 110 of the MLCC device 102 close to the second terminal 108 is illustrated in detail in FIG. 7C. FIG. 7C illustrates a potential path for moisture 122 to reach and damage electrodes 116 or 118. As discussed above, the body 104 of the capacitor may be generally impermeable. However, the moisture 122 may be able to travel along the surface of the body 104, including in the region between the body 104 and the second terminal 108. The moisture 122 may, thus, reach the termination surface 114 and cause damage to the electrodes 118, as illustrated. Therefore, capacitors that are exposed to moisture 122 from the top 110 of the MLCC device 102 may have the electrode terminations closest to the top 110 more susceptible to damage. Similarly, capacitors that are exposed to moisture 122 from the bottom 112 may have the electrode terminations closest to the bottom 112 more susceptible to damage. Thus, as detailed below, capacitors with reduced entryways in particular regions of the termination surface 114 may be more resilient against moisture damage. The FIG. 7C also illustrates a tab length 124 which may be the length of the termination region 115A, or "keep out" region.

With the foregoing in mind, perspective view 130A of FIG. 8A illustrates an embodiment of a capacitor structure 131 having a chalice-shaped termination pattern in the top 110 and bottom 112 of the termination surface 114. The chalice regions 132 may be regions having no electrodes. As a result of the presence of the chalice regions 132, the top 110 and bottom 112 of the capacitor structure 131 may be less susceptible to damage from moisture 122, as discussed above. The cross-section perspective view 130B of FIG. 8B illustrates the electrode arrangement of the capacitor structure 131. As illustrated, the chalice regions 132 (i.e., regions without conductive electrodes) extend along the body of the capacitor.

The perspective view 140A of FIG. 9A illustrates an embodiment of a capacitor structure 141 having a rounded cross-shaped termination pattern in its termination surface 114. The round cutaway regions 142 may be regions having no electrode metallization. As a result of the presence of the cutaway regions 142, the top 110 and bottom 112 of the capacitor structure 141 may be less susceptible to damage from moisture 122. The cross-section perspective view 140B of FIG. 9B illustrates the electrode arrangement of the capacitor structure 141. As illustrated, the cutaway regions 142 (i.e., regions without conductive electrodes) extend along the body of the capacitor.

Figure 10A:
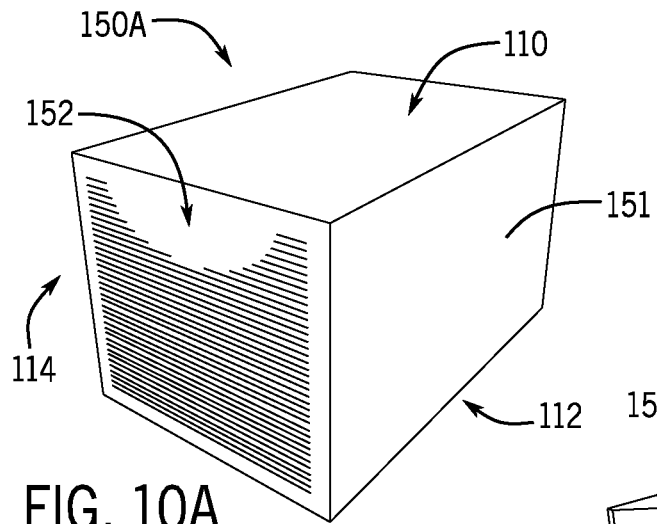
FIG. 10A is a perspective view of a MLCC with a cup-shaped termination pattern, in accordance with an embodiment.
Figure 10B:
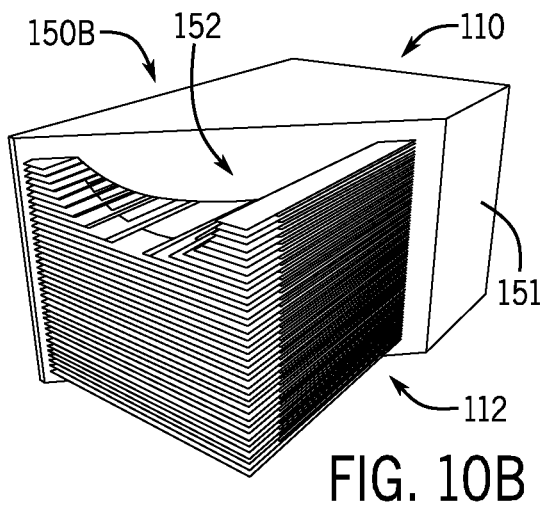
FIG. 10B is a cross-section perspective view of the MLCC of FIG. 10A that illustrates its electrode disposition, in accordance with an embodiment.

The perspective view 150A of FIG. 10A illustrates an embodiment of a capacitor structure 151 having a rounded cup-shaped termination pattern in its termination surface 114. A chalice region 152, which may be similar to the above-described chalice region 132, may be a region with no electrodes. As a result, the top 110 of the capacitor structure 151 may be less susceptible to damage from moisture 122. This arrangement may improve the reliability of the capacitor without the substantial reduction of electrodes, as in the capacitor structure 131 discussed above. The cross-section perspective view 150B of FIG. 10B illustrates the electrode arrangement of the capacitor structure 151. As illustrated, the chalice region 152 (i.e., the regions without conductive electrodes) extends along the body of the capacitor.

Figure 11A:
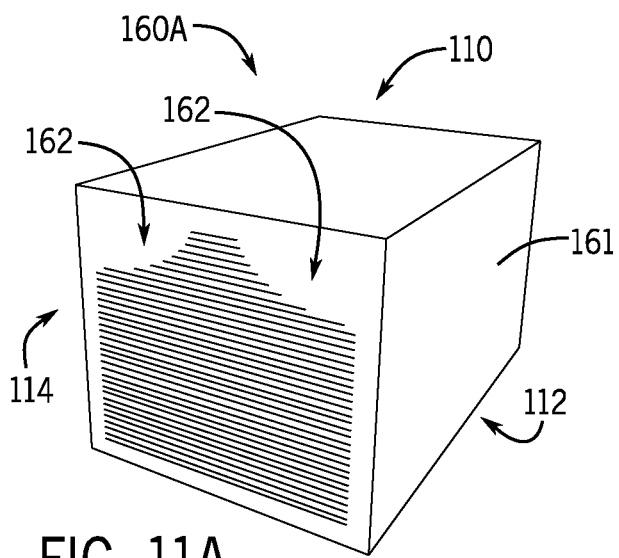
FIG. 11A is a perspective view of a MLCC with a rounded pyramidal-shaped termination pattern, in accordance with an embodiment.
Figure 11B:
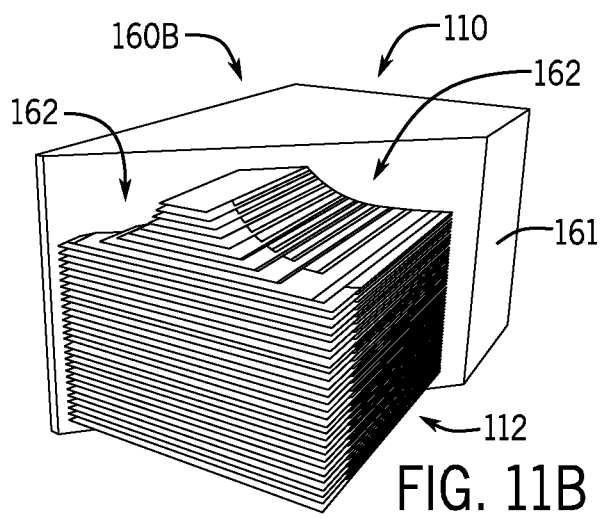
FIG. 11B is a cross-section perspective view of the MLCC of FIG. 11A that illustrates its electrode disposition, in accordance with an embodiment.

The perspective view 160A of FIG. 11A illustrates an embodiment of a capacitor structure 161 having a rounded pyramidal-shaped termination pattern in its termination surface 114. Round cutaway regions 162, which may be similar to the above-described round cutaway regions 142, may be regions of the body of the capacitor structure 161 with no electrodes. As a result, the top 110 of the capacitor structure 161 may be less susceptible to damage from moisture 122. This arrangement may improve the reliability of the capacitor without the substantial reduction of electrodes, as in the capacitor structure 141 discussed above. The cross-section perspective view 160B of FIG. 11B illustrates the electrode arrangement of the capacitor structure 161. As illustrated, the round cutaway regions 162 (i.e., the regions without conductive electrodes) extend along the body of the capacitor.

Figure 12A:
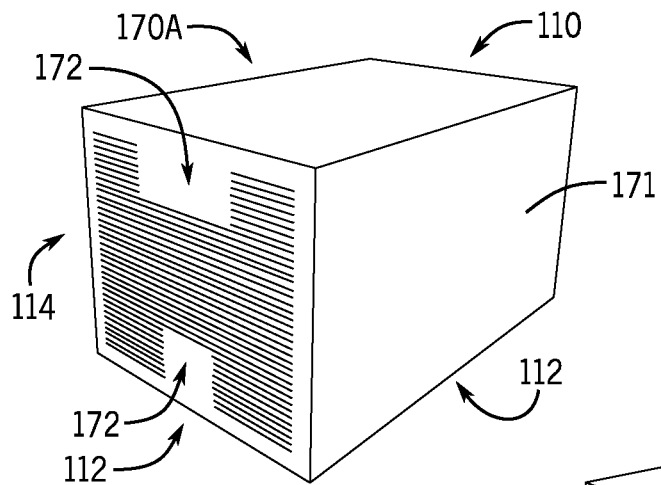
FIG. 12A is a perspective view of a MLCC with a H-shaped termination pattern, in accordance with an embodiment.
Figure 12B:
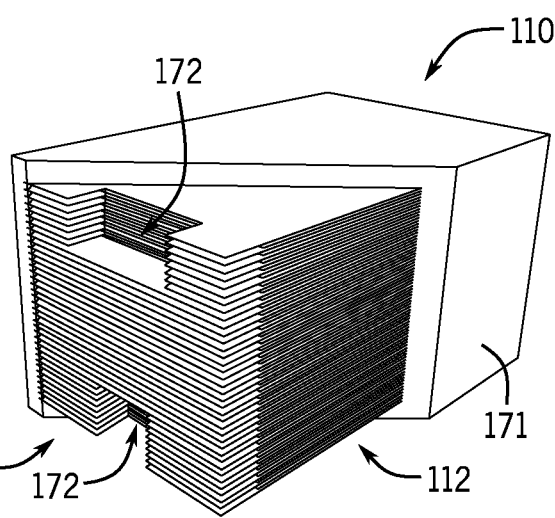
FIG. 12B is a cross-section perspective view of the MLCC of FIG. 12A that illustrates its electrode disposition, in accordance with an embodiment.

The termination patterns in the termination surface 114 of the MLCC devices described include curved cutaway regions (i.e., regions without terminations). The cutaway regions may also be straight, as in the embodiments described below. The perspective view 170A of FIG. 12A illustrates an embodiment of a capacitor structure 171 having an H-shaped termination pattern in its termination surface 114. The cutaway regions 172 may be regions having no electrodes. As a result of the presence of the cutaway regions 172, the top 110 and bottom 112 of the capacitor structure 171 may be less susceptible to damage from moisture 122. The cross-section perspective view 170B of FIG. 12B illustrates the electrode arrangement of the capacitor structure 171. As illustrated, the cutaway regions 142 (i.e., regions without conductive electrodes) is formed by removing electrode material in the termination regions 115A of the capacitor structure 171. Note that, by employing this design, the capacitance of the capacitor structure 171 may be similar to that of a capacitor structure with a regular termination pattern in its termination surface 114.

Figure 13A:
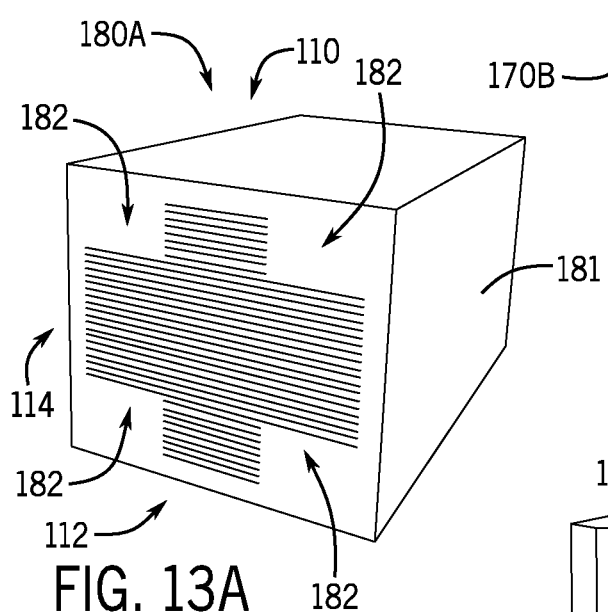
FIG. 13A is a perspective view of a MLCC with a cross-shaped termination pattern, in accordance with an embodiment.
Figure 13B:
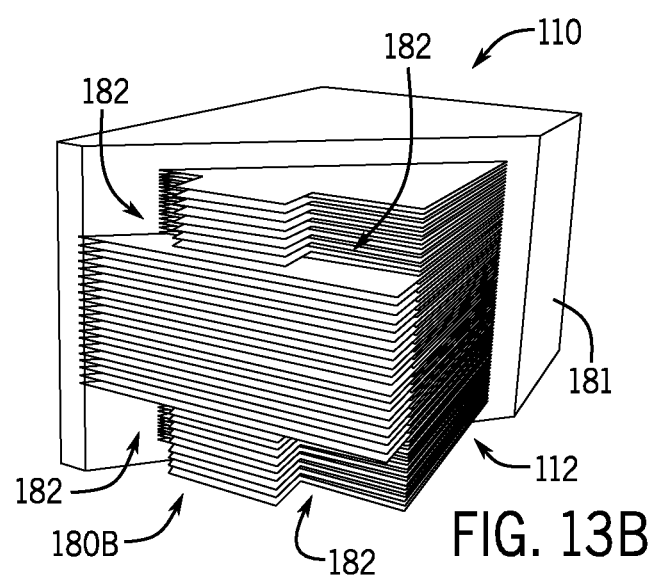
FIG. 13B is a cross-section perspective view of the MLCC of FIG. 13A that illustrates its electrode disposition, in accordance with an embodiment.

The perspective view 180A of FIG. 13A illustrates an embodiment of a capacitor structure 181 having a cross-shaped termination pattern in its termination surface 114. The cutaway regions 182 in the termination surface 114 (i.e., regions without electrodes) are straight cutaways. As a result of the presence of the cutaway regions 182, the top 110 and bottom 112 of the capacitor structure 181 may be less susceptible to damage from moisture 122. The cross-section perspective 180B of FIG. 13B illustrates the electrode arrangement of capacitor structure 181. As illustrated, the cut away regions 182 (i.e., regions without no conductive electrodes) are the termination regions 115A of the capacitor structure 181 and do not extend into the capacitive region 115B. By employing this design, the capacitance characteristics of the capacitor structure 181 may be substantially similar to that of a regular capacitor structure (i.e., without cutaway regions) using the similar materials and similar dimensions.

Figure 14A:
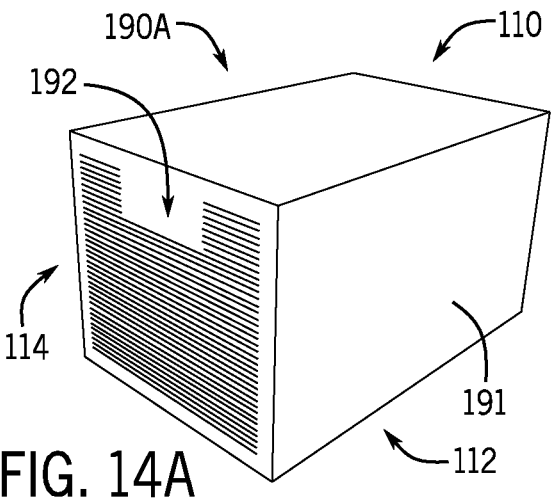
FIG. 14A is a perspective view of a MLCC with a U-shaped termination pattern, in accordance with an embodiment.
Figure 14B:
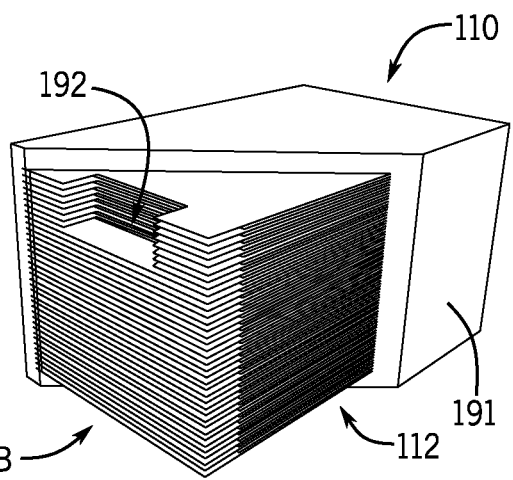
FIG. 14B is a cross-section perspective view of the MLCC of FIG. 14A that illustrates its electrode disposition, in accordance with an embodiment.

The perspective view 190A of FIG. 14A illustrates an embodiment of a capacitor structure 191 having a U-shaped termination pattern in its termination surface 114. The cutaway region 192, which may be similar to the above-described cutaway region 172 of capacitor structure 171, may be a region of the termination region 115A of capacitor structure 191 without electrode materials. As a result, the top 110 of the capacitor structure 191 may be less susceptible to damage from moisture 122. The cross-section perspective view 190B of FIG. 14B illustrates the electrode arrangement of the capacitor structure 191. As illustrated, the cutaway region 192 is in the termination region 115A of the capacitor structure 191 and does not necessarily extend into the capacitive region 115B. By employing this design, the capacitance characteristics of the capacitor structure 181 may be substantially similar to that of a regular capacitor structure (i.e., without cutaway regions) using the similar materials and similar dimensions.

Figure 15A:
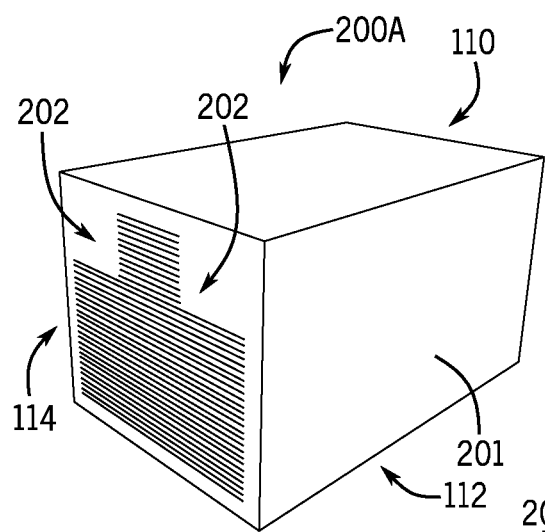
FIG. 15A is a perspective view of a MLCC with a T-shaped termination pattern, in accordance with an embodiment.
Figure 15B:
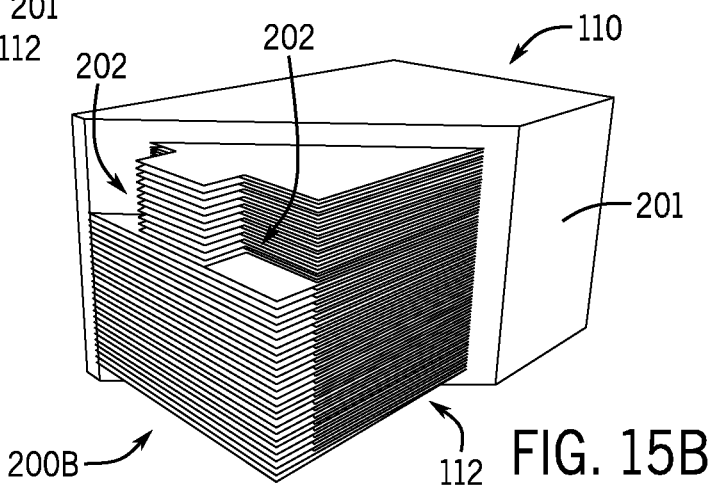
FIG. 15B is a cross-section perspective view of the MLCC of FIG. 15A that illustrates its electrode disposition, in accordance with an embodiment.

Perspective view 200A of FIG. 15A illustrates an embodiment of a capacitor structure 201 having a T-shaped termination pattern in its termination surface 114. The cutaway regions 202, which may be similar to the above-described cutaway region 182 of capacitor structure 181, may be regions of the termination region 115A of capacitor structure 191 without electrodes. As a result, the top 110 of the capacitor structure 191 may be less susceptible to damage from moisture 122. The cross-section perspective view 200B of FIG. 15B illustrates the electrode arrangement of the capacitor structure 201. As illustrated, the cutaway regions 202 are in the termination region 115A of the capacitor structure 201, and do not necessarily extend into the capacitive region 115B. By employing this design, the capacitance characteristics of the capacitor structure 201 may be substantially similar to that of a regular capacitor structure (i.e., without cutaway regions) using the similar materials and similar dimensions.

Figure 16A:
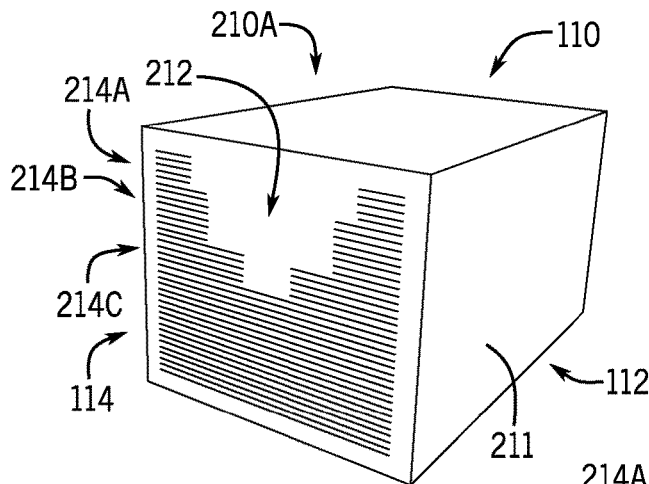
FIG. 16A is a perspective view of a MLCC with a staircase-shaped termination pattern, in accordance with an embodiment.
Figure 16B:
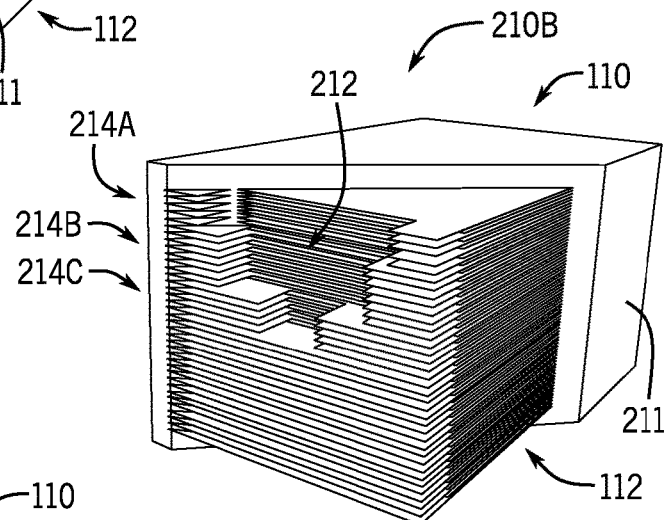
FIG. 16B is a cross-section perspective view of the MLCC of FIG. 16A that illustrates its electrode disposition, in accordance with an embodiment.

Perspective view 210A of FIG. 16A illustrates an embodiment of a capacitor structure 211 having a staircase-shaped termination pattern in its termination surface 114. The staircase shape may be defined by the exposed terminations of electrodes in the termination surface 114. The cutaway region 212, may be regions of the capacitor structure 211 without electrodes. As a result, the top 110 of the capacitor structure 211 may be less susceptible to damage from moisture 122. The cross-section perspective view 210B of FIG. 16B illustrates the electrode arrangement of the capacitor structure 211. As illustrated, the cutaway region 212 is in the termination region 115A of the capacitor structure 211 and does not necessarily extend into the capacitive region 115B. By employing this design, the capacitance characteristics of the capacitor structure 211 may be substantially similar to that of a regular capacitor structure (i.e., without cutaway regions) using the similar materials and similar dimensions.

Figure 17A:
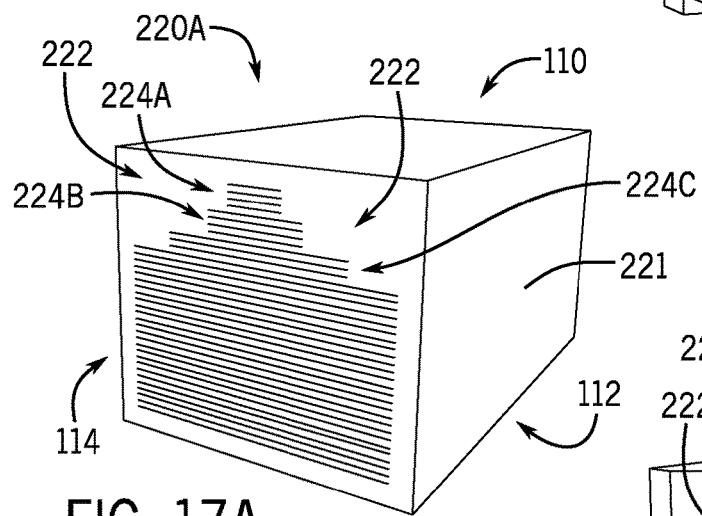
FIG. 17A is a perspective view of a MLCC with a pyramidal-shaped termination pattern, in accordance with an embodiment.

Perspective view 220A of FIG. 17A illustrates an embodiment of a capacitor structure 221 having a pyramidal termination pattern in its termination surface 114. The pyramid shape may be defined by the exposed terminations of electrodes in the termination surface 114. The cutaway regions 222, may be regions of the capacitor structure 221 without electrodes. As a result, the top 110 of the capacitor structure 221 may be less susceptible to damage from moisture 122. The cross-section perspective view 220B of FIG. 16B illustrates the electrode arrangement of the capacitor structure 221. As illustrated, the cutaway regions 222 are in the termination region 115A of the capacitor structure 220, and do not necessarily extend into the capacitive region 115B. By employing this design, the capacitance characteristics of the capacitor structure 221 may be substantially similar to that of a regular capacitor structure (i.e., without cutaway regions) using the similar materials and similar dimensions.

Figure 18A:
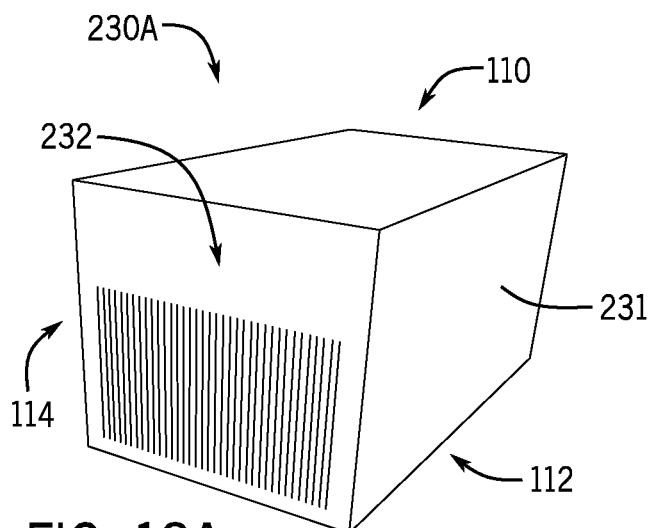
FIG. 18A is a perspective view of a MLCC with a reduced height termination pattern, in accordance with an embodiment.

The capacitor structures 131, 141, 151, 161, 171, 181, 191, 201, 211, and 221 described above employ horizontal electrodes, electrodes that are parallel to the bottom surface of the capacitor structure. Cutaway regions in a top or bottom of a capacitor structure may also be obtained using vertical electrodes, electrodes that are perpendicular to the bottom surface of the capacitor structure. Perspective view 230A of FIG. 18A illustrates an embodiment of a capacitor structure 231 having a reduced height termination pattern in its termination surfaces 114. The electrode terminations exposed in the termination surface are vertical (i.e., perpendicular to the bottom surface of the capacitor structure).

Figure 18B:
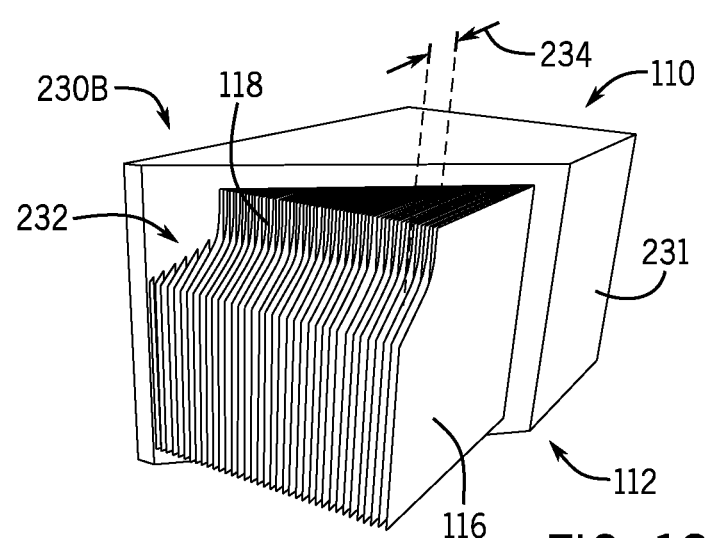
FIG. 18B is a cross-section perspective view of the MLCC of FIG. 18A that illustrates its electrode disposition, in accordance with an embodiment.

The reduced height shape in the termination surface is defined by a limited height of the exposed electrode terminations in the termination surface 114. The cutaway region 232, may be regions of the capacitor structure 231 without electrodes. As a result, the top 110 of the capacitor structure 231 may be less susceptible to damage from moisture 122. The cross-section perspective view 230B of FIG. 18B illustrates the electrode arrangement of the capacitor structure 231. As illustrated, the cutaway region 232 is in the termination may have a length 234, and the electrodes may be tapered in this region. The cutaway region 232 may be in the termination region 115A of the capacitor structure 231 and does not necessarily extend into the capacitive region 115B. By employing this design, the capacitance characteristics of the capacitor structure 211 may be substantially similar to that of a regular capacitor structure (i.e., without cutaway regions) using the similar materials and similar dimensions.

Figure 19:
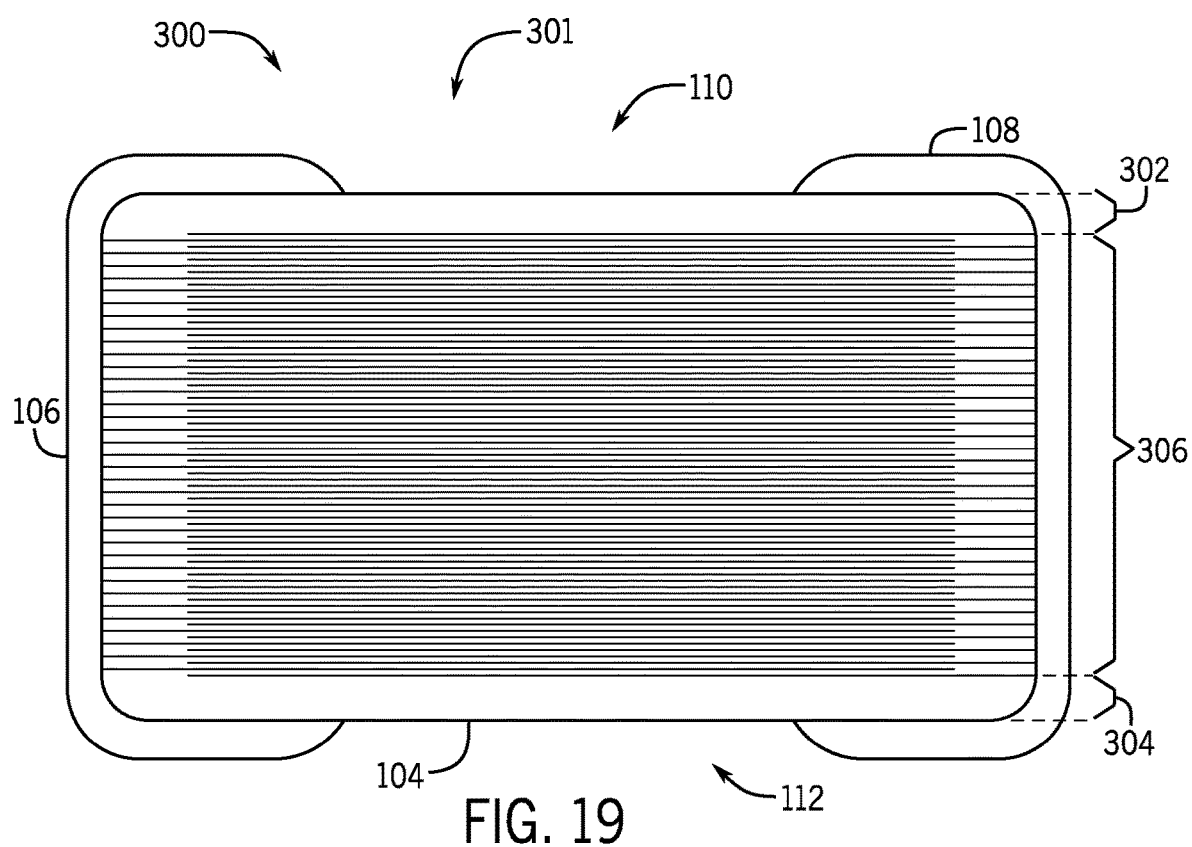
FIG. 19 is a cross section front view of an MLCC illustrating a region that may be used for a lid region or a floor region, in accordance with an embodiment

In the capacitor structures 131, 141, 151, 161, 171, 181, 191, 201, 211, 221, and 221 described above, the potential damage caused to the capacitor by potential moisture (e.g., moisture 122) is mitigated by limiting the amount of exposed terminations in the termination surface 114. As discussed above, the environmental exposure of the termination surface 114 may result from stresses in the body of the capacitor due to mismatch of physical characteristics in regions with different metallization density in the capacitor. This type of mismatch is illustrated in the front view 300 of an MLCC device 301, in FIG. 19. The MLCC device 301 may have a body 104 and terminals 106 and 108. The top 110 of the MLCC device 301 may have a lid region 302 and the bottom 112 of the MLCC device 301 may have a floor region 304, which are characterized by an absence of electrode metallization. By contrast, the middle region 306 may have dense electrode metallization embedded between the dielectrics. Conventionally, the ceramic material between the electrodes in the middle region 306 may be the same material as the ceramic material in the lid region 302 and the floor region 304. However, the presence of the electrode metallization may impact aggregate physical characteristics of the material in the region, such as thermal capacity, thermal expansion coefficient, piezoelectric coefficient, and/or rigidity. As a result, these physical characteristics in the lid region 302 and/or the floor region 308 may be distinct from the physical characteristics in the middle region 306. As discussed above, this mismatch in the physical characteristics of the material may cause micro fractures in the body 104 of the MLCC device 301 during regular usage, which increases vulnerability of the MLCC device 301 to moisture damage.

Figure 20A:
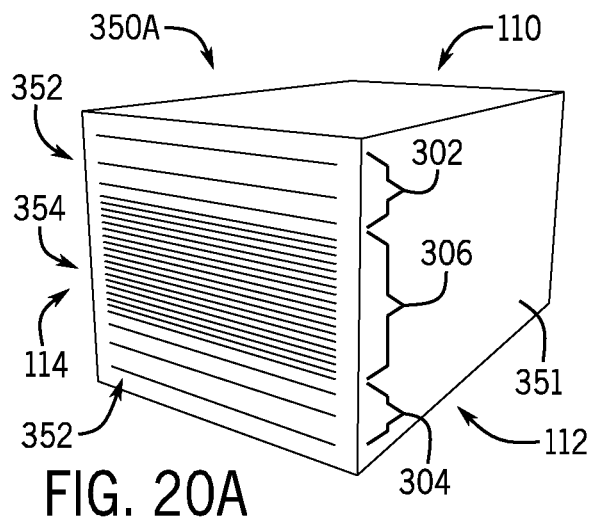
FIG. 20A is a perspective view of a MLCC with low electrode density in a lid and floor region of the capacitor pattern, in accordance with an embodiment.

With the foregoing in mind, the perspective view 350A of FIG. 20A illustrates an embodiment of a capacitor structure 351 having variable density of metallization. The variable density of the metallization is generated by a variable electrode density, which may be observed in the termination pattern exposed in the termination surface 114. The capacitor structure 351 may have low electrode density 352 in the lid region 302 and floor region 304, and may have a high electrode density 354 in the middle region 306. As a result of the presence of electrodes in the lid region 302 and floor region 304, the mismatch in the physical characteristics between materials in these regions and materials in the middle region 306 may be reduced. This may decrease the presence micro fractures over time and may prevent the permeabilization of the capacitor structure 351, and resulting moisture damage.

Figure 20B:
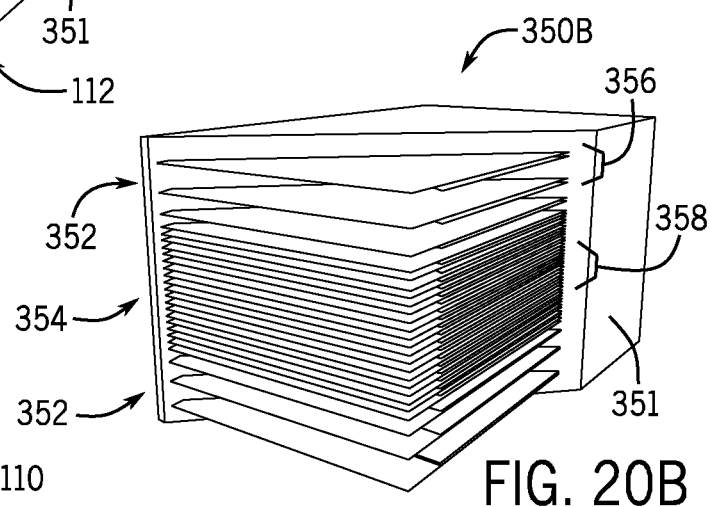
FIG. 20B is a cross-section perspective view of the MLCC of FIG. 20A that illustrates its electrode disposition, in accordance with an embodiment.

The cross-section perspective view 350B of FIG. 20B further illustrates the variable density in the electrode arrangement of the capacitor structure 351. As illustrated, the regions with low electrode density 352 may be present sparse metallization relative to the high electrode density region 354. It should be noted that, in order to preserve the nominal capacitance of the capacitor structure 351, the separation between adjacent electrodes 356 that form capacitive coupling in the region with low electrode density 352 may be substantially similar to the separation between adjacent electrodes 358, in the region of high electrode density 354. The increased separation in the low electrode density region 352 is obtained by increasing the separation between the pairs of electrodes, as illustrated. By employing this design, the mismatch in the physical characteristics may be reduced, and the capacitor may have an improved lifetime.

Figure 21A:
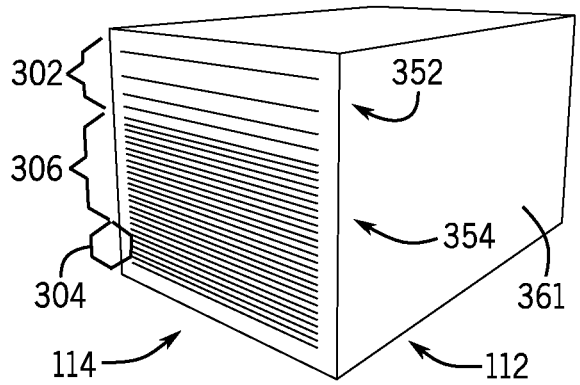
FIG. 21A is a perspective view of a MLCC with low electrode density in a lid region of the capacitor pattern, in accordance with an embodiment.

The perspective view 360A of FIG. 21A illustrates an embodiment of another capacitor structure 361 having variable density of electrodes. The variable density of the electrodes is observed in the termination pattern exposed in the termination surface 114. The capacitor structure 361 may have low electrode density 352 in the lid region 302, and may have high electrode density 354 in the middle region 306 and the floor region 304. As with the capacitor structure 351 described above, the presence of electrodes in the lid region 302 decreases differences in the physical characteristics between the regions with low electrode density 352 and high electrode density 354. Moreover, the floor region 304 of the capacitor structure 361 has the same electrode density as the middle region 306 and, thus, substantially decreasing any mismatch in the physical characteristics. As a result, capacitor structure 361 may present less micro fractures over time and, further, may prevent moisture damage due to permeabilization.

Figure 21B:
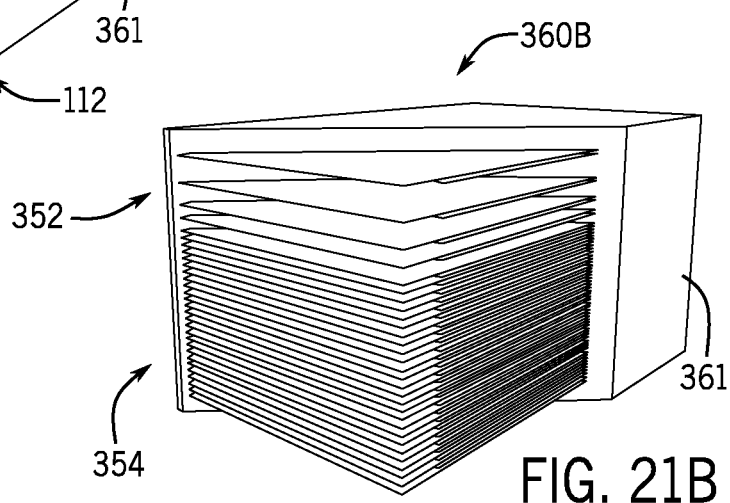
FIG. 21B is a cross-section perspective view of the MLCC of FIG. 21A that illustrates its electrode disposition, in accordance with an embodiment.

The cross-section perspective view 360B of FIG. 21B further illustrates the variable density in the electrode arrangement of the capacitor structure 361. As illustrated, the regions with low electrode density 352 may have less metallization relative to the high electrode density region 354. It should be noted that, in order to preserve the nominal capacitance of the capacitor structure 351 the separation between adjacent electrodes 356 that form capacitive coupling in the region with low electrode density 352 may be substantially similar to the separation between adjacent electrodes 358, in the region of high electrode density 354.

The capacitor structures 351 and 361 described above may have a variable metallization density that is obtained by changing the space between neighboring pair of plates in the lid region 302 and/or floor region 304. This variable density region, which reduces mismatch in the physical characteristics, may also be obtained by reducing the area of the electrodes in the lid region 302 and/or floor region 304. The perspective view 370A of FIG. 22A illustrates an embodiment of a capacitor structure 371 having a variable density of the electrode metallization using a crenelated electrode arrangement. The arrangement of electrodes in capacitor structure 371 is illustrated in the termination pattern exposed in the termination surface 114. The capacitor structure 371 may have crenelated electrode patterns 372 and 374, both in the lid region 302 and floor region 304. The middle region 306 and may present regular electrode arrangement 376 in the middle region 306. The cross-section perspective view 370B of FIG. 22B further illustrates the variable density in the electrode arrangement along the body of the capacitor structure 371. As illustrated, the lid region 302 and floor region 304 may present sparse metallization relative to the middle region 306 by having the crenelated pattern along the entire body of the capacitor. The crenelated pattern may be implemented along the border by the use of adequately placed electrode strips. It should be noted that the crenelated pattern allows a decreased metallization density without an increased spacing between parallel electrodes in different layers.

In the capacitor structure 371, the crenelated electrode pattern 372 may present a lower metallization density than the crenelated electrode pattern 374. Furthermore, the crenelated electrode pattern 374 may present a lower metallization density than the regular electrode arrangement 376. As a result, the capacitor structure 371 presents a metallization density gradient from the bottom 112 and from the top 110 of the capacitor structure 371 towards the middle region 306. That is, the metallization gradient in capacitor structure 371 gradually decreases from the middle region 306 towards the bottom 112 and towards the top 110. The gradual change of metallization density may lead to a more gradual change in the physical characteristics discussed herein. The gradual change in the physical characteristics may prevent micro fractures from forming when the capacitor is under stress. Accordingly, the use of the crenelated pattern to generate a gradient in metallization density may decrease the presence micro fractures over time and may prevent the permeabilization of the capacitor structure 371.

The perspective view 380A of FIG. 23A illustrates another embodiment of a capacitor structure 381 having a crenelated electrode arrangement. The crenelated pattern is illustrated the termination pattern exposed in the termination surface 114. As illustrated, the lid region 302 may have crenelated patterns 382, 384, 386, and 388, and the middle region 306 and floor region 304 may have a regular electrode arrangement 389. The cross-section perspective view 380B of FIG. 23B further illustrates the crenelated patterns 382, 384, 386, and 388 along the body of the capacitor structure 381. In the capacitor structure 381, the lid region 302 presents a more granular gradient in the metallization.

The metallization density in the crenelated pattern 382 is smaller than in the crenelated pattern 384, the metallization density in the crenelated pattern 384 is smaller than in the crenelated pattern 386, and the metallization density in the crenelated pattern 386 may be smaller than in the crenelated pattern 388. That is, there is a 5-step gradient in the metallization density from the top 110 of the capacitor structure 381 towards the regular electrode arrangement 389 in the middle region 306. The increase in the granularity of the metallization density, and the associated increase in the granularity of physical characteristics, may lead to a decrease in micro fractures caused by usage stress in the capacitor structures 371.

Figure 24A:
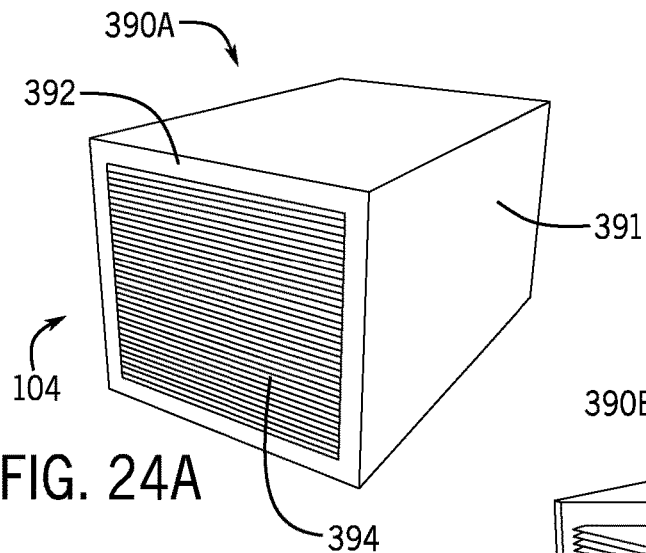
FIG. 24A is a perspective view of a MLCC with matched thermal expansion coefficient material along the body of the capacitor, in accordance with an embodiment.
Figure 24B:
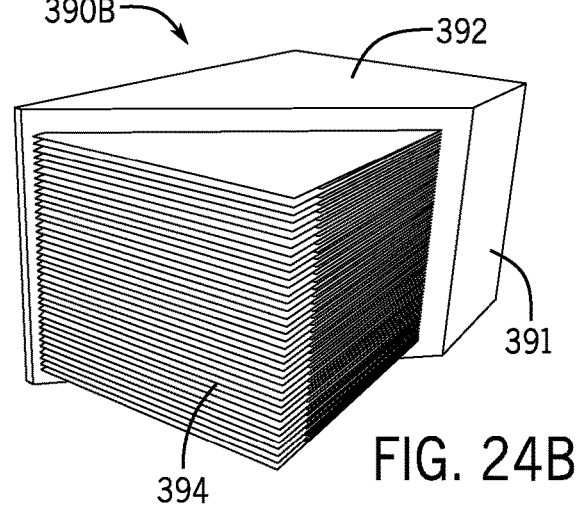
FIG. 24B is a cross-section perspective view of the MLCC of FIG. 24A that illustrates its electrode disposition and its cover material disposition, in accordance with an embodiment.

The reduction in the mismatch of physical characteristics within an MLCC capacitor may also be obtained by changing the material used the non-metallized regions of the capacitor. The perspective view 390A of FIG. 24A illustrates an embodiment of a capacitor structure 391 that may employ distinct materials. The capacitor structure 391 may have a non-metallized portion 392 and a metallized portion 394. As illustrated, the non-metalized portion 392 encapsulates the metalized portion 394. The cross-section perspective view of 390B of FIG. 24B illustrates the disposition of the electrodes in the metallized portion 394. Note that the geometrical arrangement of the electrodes may be similar to that of a conventional multilayer ceramic capacitor.

As discussed above, the metalized portion 394 may be formed from a first substrate material (e.g., a first ceramic material) and a conductive material (e.g., the conductive electrodes). In the capacitor structure, the non-metalized portion 392 may be formed from a second substrate material, which may be a different ceramic material or a modification of the first ceramic material. The second substrate material may be chosen to generate a match between the physical characteristics of the non-metallized portion 392 and the metallized portion 394. The choice of materials or modifications for the materials that may be used to form the non-metallized portion 392 and the metallized portion 394 is detailed below.

MLCCs may be produced by stacking ceramic layer sheets with stenciled electrode regions, as detailed below. Thus, in capacitor structure 391 a ceramic sheet may have an electrode region which may be part of the metallized portion 394 and a region without any electrode region, which may be in the non-metallized portion 392. Therefore, formation of capacitor structure 391 may include a step for modifying the ceramic substrate in the non-metallized portion 392, which is detailed below, in the discussion of the method described in FIG. 31.

Figure 25A:
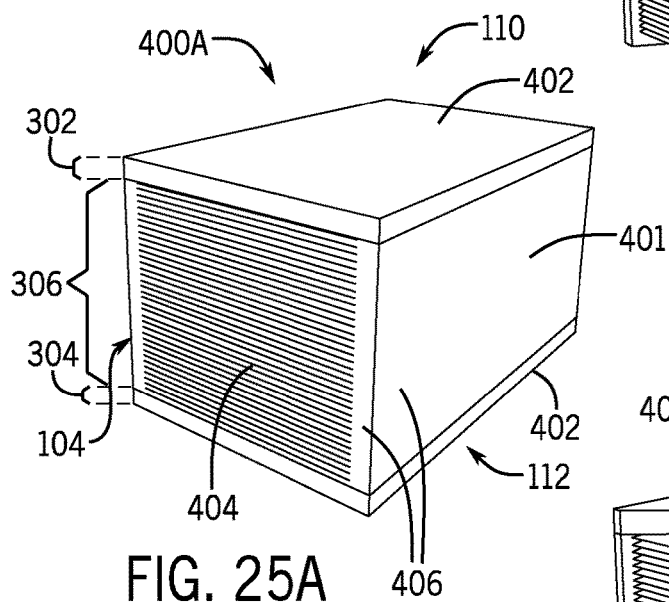
FIG. 25A is a perspective view of a MLCC with matched thermal expansion material in a lid and a floor region of the capacitor, in accordance with an embodiment.
Figure 25B:
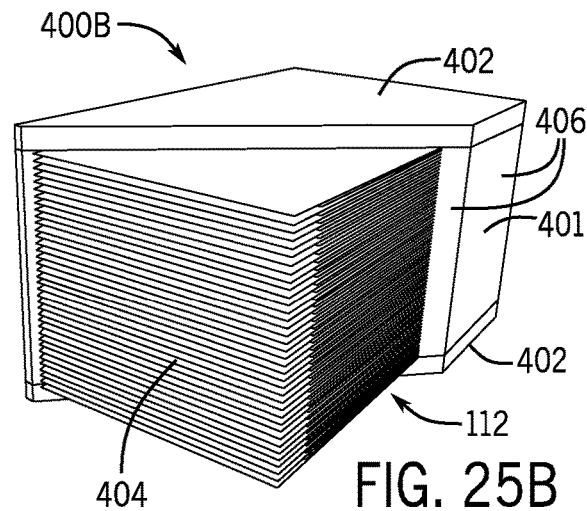
FIG. 25B is a cross-section perspective view of the MLCC of FIG. 25A that illustrates its electrode and cover material disposition, in accordance with an embodiment.

In certain applications, the mismatch in physical characteristics on the interface between the top and/or the bottom of the capacitor and the metallized regions may be the particularly vulnerable to the effects from mismatch, discussed above. The perspective view 400A of FIG. 25A illustrates an embodiment of a capacitor structure 401 that may employ distinct materials to mitigate mismatch using a simpler manufacturing process. As with the capacitor structure 391, capacitor structure 401 may have a non-metallized portion, formed by layers 402 and by portions 406, as well as a metallized portion 404. Layers 402 may be disposed in the lid region 302 and the floor region 304 of the capacitor. Portions 406 and the metallized portion 404 may be in the middle region 306 of the capacitor. The cross-section perspective view of 400B of FIG. 25B illustrates the disposition of the electrodes in the metallized portion 404. Note that the geometrical arrangement of the electrodes may be similar to that of a conventional multilayer ceramic capacitor.

In the capacitor structure 391, the ceramic layers in the middle region 306 of the capacitor may be formed from a first substrate material (e.g., a first ceramic material), and the ceramic layers of layers 402, in the lid region 302 and the floor region 304, may be formed from a second substrate material. The second substrate material may be chosen to generate a match between the physical characteristics of the layers 402 and the metallized portion 404 in the middle region 306. It should be noted that, while the capacitor structure 401 may be produced employing a simpler manufacturing process relative to the manufacturing of capacitor structure 391, there may be a mismatch of physical characteristics between portions 406 and the metalized portion 404, along the middle region 306.

Figure 26A:
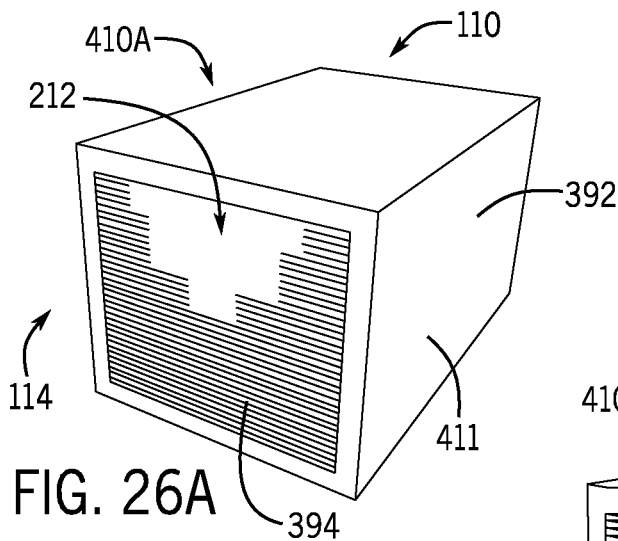
FIG. 26A is a perspective view of a MLCC with a staircase-shaped electrode termination and matched thermal expansion material along the body of the capacitor, in accordance with an embodiment.
Figure 26B:
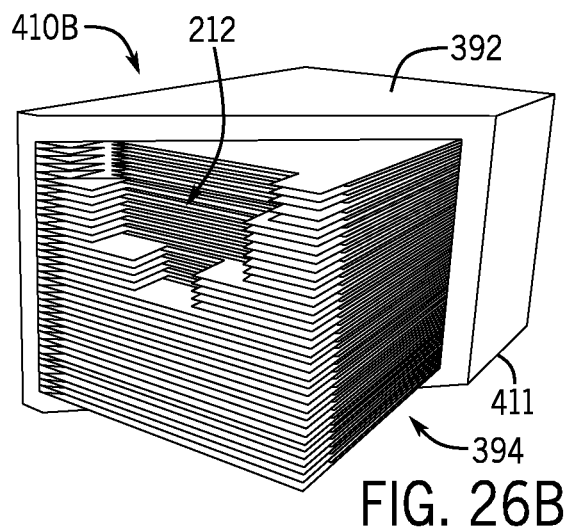
FIG. 26B is a cross-section perspective view of the MLCC of FIG. 26A that illustrates its electrode and cover material disposition, in accordance with an embodiment.

Capacitor structures that combine concepts discussed above, such as the use of mixed materials to prevent formation of micro fractures, and reduced termination patterns to decrease potential exposure to moisture are also disclosed herein. For example, the capacitor structure 411 illustrated in the perspective view 410A of FIG. 26A and the cross-section perspective view 410B of FIG. 26B may have a stair-case-shaped termination pattern in the termination surface 114 with a cutaway region 212, similar to the ones discussed with respect to capacitor structure 211 of FIGS. 16A and 16B. The capacitor structure 411 may also employ different materials (e.g., different substrates or modification of a common substrate) in the non-metallized portion 392 that encapsulates the metallized portion 394, as discussed with respect to capacitor structure 391 of FIGS. 24A and 24B. As such, the combination of the concepts may provide a combination of the characteristics for improved reliability. The capacitor may be less susceptible to the formation of micro fractures and, further, may be less susceptible to damage in the presence of the micro fractures.

Figure 17B:
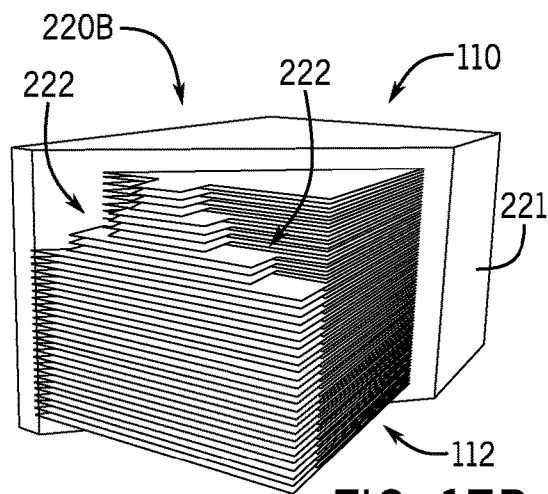
FIG. 17B is a cross-section perspective view of the MLCC of FIG. 17A that illustrates its electrode disposition, in accordance with an embodiment.
Figure 27A:
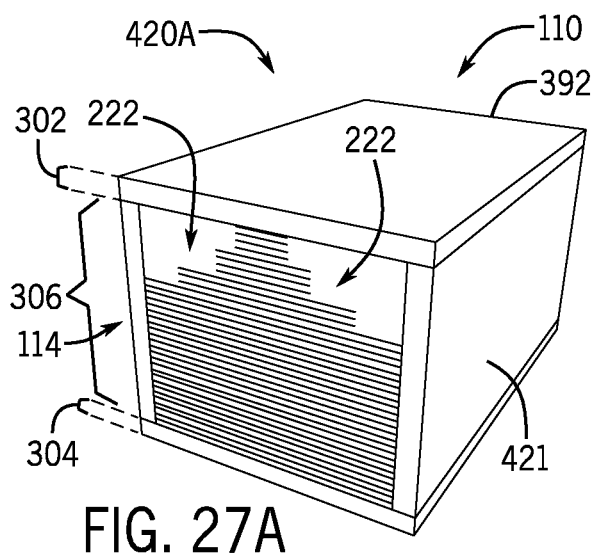
FIG. 27A is a perspective view of a MLCC with a pyramidal shaped electrode termination and matched thermal expansion material in a lid and a floor region of the capacitor, in accordance with an embodiment.
Figure 27B:
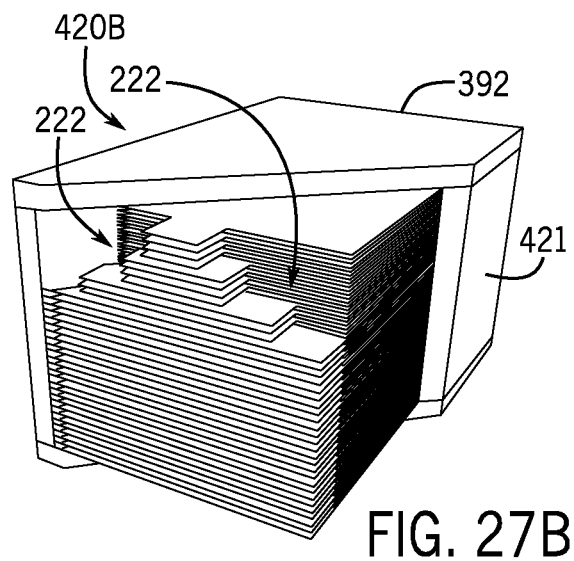
FIG. 27B is a cross-section perspective view of the MLCC of FIG. 27A that illustrates its electrode and cover material disposition, in accordance with an embodiment.

In another example that employs combination of concepts for improved reliability described above, a capacitor structure 421 illustrated in the perspective view 420A of FIG. 27A and the cross-section perspective view 420B of FIG. 27B may have reduced metallization in the termination pattern and a combination of materials for matching of physical properties. A pyramidal termination pattern in the termination surface 114 with cutaway regions 222, similar to the one discussed with respect to capacitor structure 221 of FIGS. 17A and 17B, may provide reduced exposure of the metallization to moisture. Moreover, the capacitor structure 421 may also employ different materials (e.g., different substrates or modifications of a common substrate) in the lid region 302, floor region 304, and middle region 306 to decrease mismatch in physical characteristics and reduce the vulnerability of the capacitor structure 421 to formation of micro fractures, as discussed with respect to capacitor structure 401 of FIGS. 25A and 25B. The combination of the reliability improvement concepts in capacitor structure 421 may make it less susceptible to the formation of micro fractures and less susceptible to damage in the presence of the micro fractures due to moisture 122.

Figure 28A:
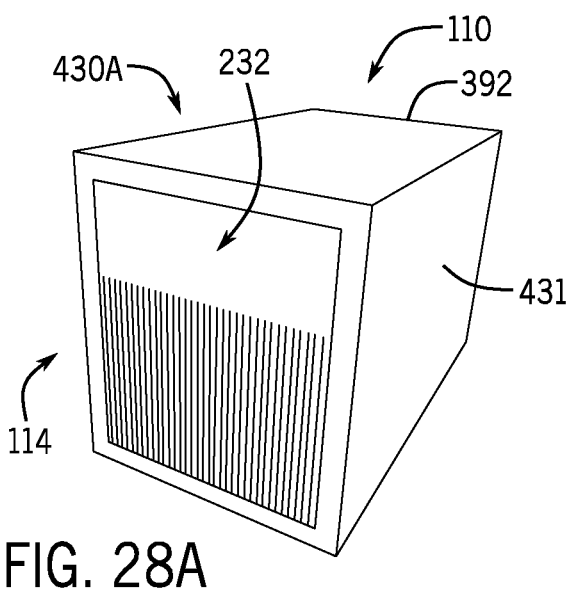
FIG. 28A is a perspective view of a MLCC with reduced height termination pattern and matched thermal expansion material along the body of the capacitor, in accordance with an embodiment.
Figure 28B:
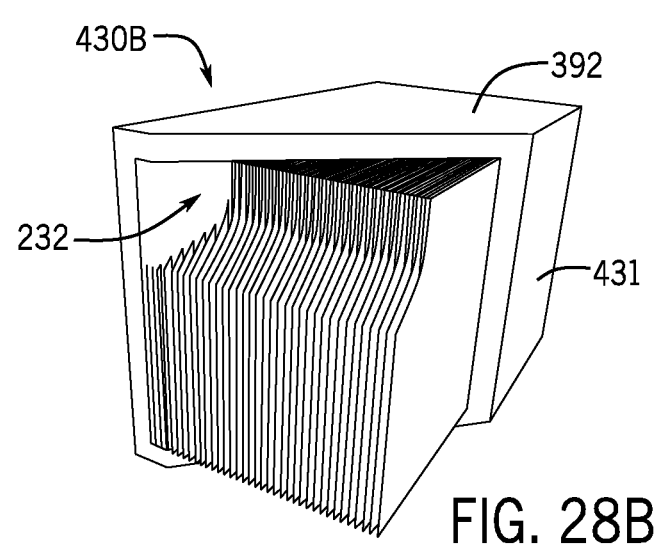
FIG. 28B is a cross-section perspective view of the MLCC of FIG. 28A that illustrates electrode and the cover material disposition, in accordance with an embodiment.

In another example, the capacitor structure 431, illustrated by the perspective view 430A of FIG. 28A and the cross-section perspective view 430B of FIG. 28B, may also have a combination of a reduced metallization in the termination pattern and a combination of materials for matching of physical characteristics. Capacitor structure 431 may employ horizontal electrodes, i.e., electrodes perpendicular to the bottom surface of the capacitor structure. The termination surface 114 may have a reduced height termination pattern, defined by a limited height of the exposed electrode termination along the termination surface 114 and the cutaway region 232 without metallization. The reduced-height termination pattern may decrease the susceptibility of the capacitor to damage from exposure to moisture 122. The capacitor structure 431 may also employ different materials (e.g., different substrates or modification of a common substrate) in the non-metallized portion 392 that encapsulates the metallized portion 394, similar to capacitor structure 391 of FIGS. 24A and 24B. The combination of the reliability improvement concepts in capacitor structure 431 may make it less susceptible to the formation of micro fractures and less susceptible to damage in the presence of the micro fractures.

While the above descriptions may refer to certain structures that implement the above-described reliability improvement concepts and features, it should be understood that other electrode shapes, electrode terminations, and materials may be used to implement the above-described concepts. Capacitor structure 441, illustrated in perspective view 440A and cross-section perspective view 440B, and capacitor structure 451, illustrated in perspective view 450A and cross-section perspective view 450B are examples of embodiments that may mix different geometries to implement the concepts.

Figure 29A:
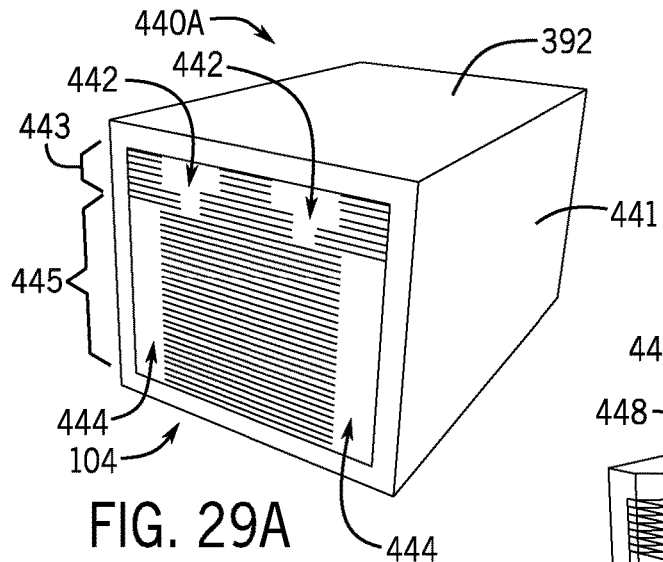
FIG. 29A is a perspective view of an MLCC with crenelated terminations in a lid region of the capacitor, and curved electrodes in a central and floor region of the capacitor, in accordance with an embodiment.
Figure 29B:
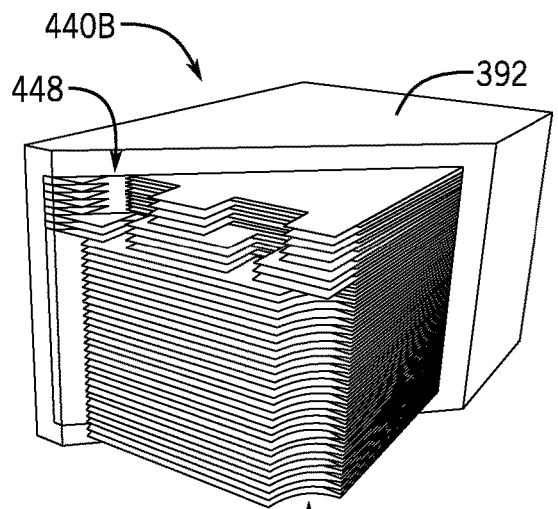
FIG. 29B is a cross-section perspective view of the MLCC of FIG. 29A that illustrates its electrode and the cover material disposition, in accordance with an embodiment.

Capacitor structure 441, in FIGS. 29A and 29B, may combine reduced exposed metallization with decreased mismatching in physical characteristics of the capacitor. The capacitor structure 441 may have reduced exposed metallization in its termination surface 114 by a mixture of staircase shaped electrode terminations 443 and reduced width electrode terminations 445. The staircase shaped electrode terminations 443 may be defined by the cutaway regions 442, which may be staircase-shaped cutaway regions. The cutaway regions 442 may be limited to the "keep out" region 448. The reduced width electrode terminations 445 may be defined by cutaway regions 444, which may be perpendicular cutaway regions. It should be noted that the cutaway regions 444 may be implemented by use of curves 446 in the electrode shape. The cutaway regions 442 and 444 may reduce the potential exposure to moisture 122, as discussed above. The capacitor structure 441 may also employ different materials (e.g., different substrates or modification of a common substrate) in the non-metallized portion 392 that encapsulates the body of the capacitor, to decrease mismatches in the physical characteristics of the capacitor and, thus, reduce the susceptibility to the formation of micro fractures, as discussed above.

Figure 30A:
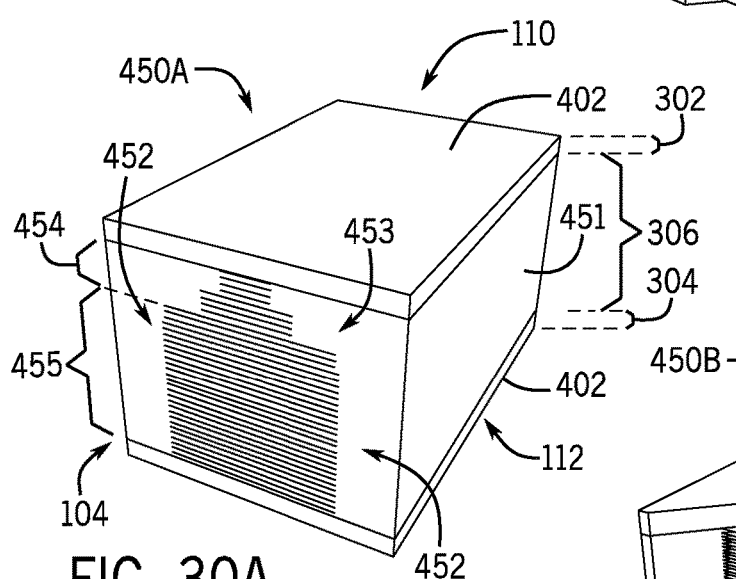
FIG. 30A is a perspective view of an MLCC with pyramidal termination patterns and a mixture of right-angled and curved electrodes in a central and floor region of the capacitor, in accordance with an embodiment.
Figure 30B:
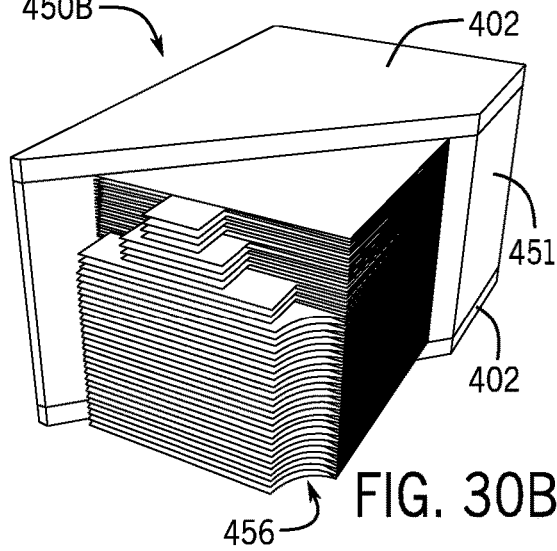
FIG. 30B is a cross-section perspective view of the MLCC of FIG. 30A that illustrates its electrode and the cover material disposition, in accordance with an embodiment.

Capacitor structure 451, in FIGS. 30A and 30B, may also combine reduced exposed metallization with decreased mismatching in physical characteristics of the capacitor. The capacitor structure 451 may have reduced exposed metallization in its termination surface 114 by a mixture of pyramid shaped electrode terminations 454 and reduced width electrode terminations 455. The pyramid shaped electrode terminations 454 may be defined by the cutaway regions 453. The reduced width electrode terminations 455 may be defined by cutaway regions 452. Cut away regions 452 may be implemented with curves 456 in the electrode shape in the "keep out" region. The cutaway regions 452 and 453 may reduce the potential exposure to moisture 122, as discussed above. The capacitor structure 451 may also employ different materials (e.g., different substrates or modification of a common substrate) the capacitor structure 421 may also employ different materials (e.g., different substrates or modifications of a common substrate) in layers 402 in the lid region 302 and floor region 304, and the layers in the middle region 306. This arrangement may decrease mismatch in physical characteristics and reduce the formation of micro fractures in the interface between layers 402 and the metallized layers in the middle region 306.

Figure 31:
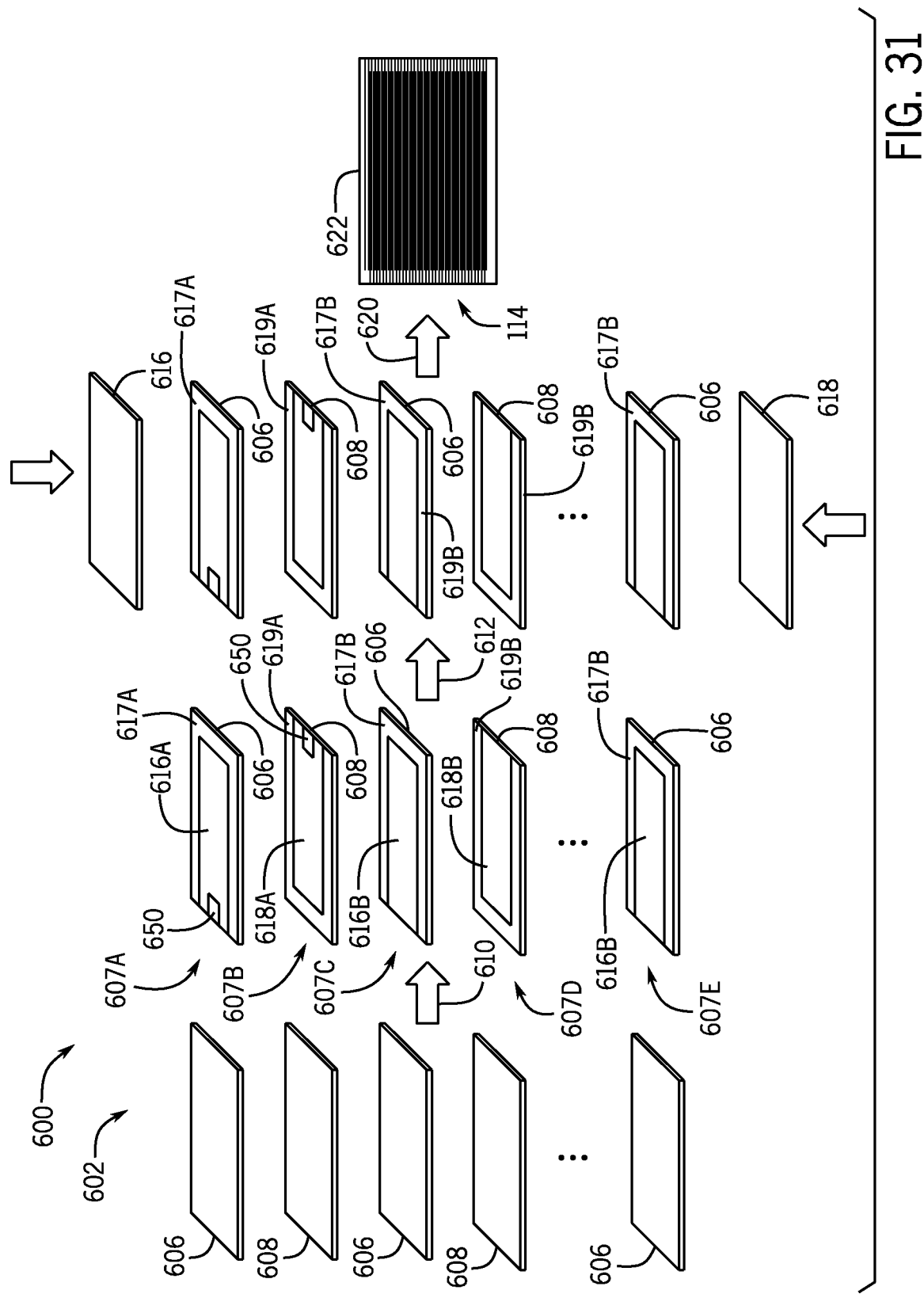
FIG. 31 is a flow diagram illustrating a method to assemble an MLCC, such as the ones described herein.

Several of the embodiments illustrated above may be implemented as multilayer ceramic capacitors. The flow diagram in FIG. 31 illustrates a method 600 that may be used to manufacture capacitors such as the multilayer ceramic capacitors with reduced entryways and/or matched physical characteristics described herein. The method 600 may illustrate the formation of a capacitor with a U-shaped pattern, such as in capacitor structure 191, and that employs matched physical characteristics between metallized and non-metallized regions, such as in capacitor structure 391. However, it should be noted that all embodiments described herein may be manufactured with the method 600, with the appropriate modifications to electrode layout, stacking arrangement, and/or choice of materials. The method 600 may employ a first set of ceramic green sheets 606 that may be used to form a first set of electrodes, to be coupled to a first terminal and a second set of ceramic green sheets 608 that may be used to form a second set of electrodes, to be coupled to a second terminal of the capacitor structure.

In a process 610, electrode layers may be formed in the ceramic green sheets 606 and 608 by applying (e.g., stenciling) a conductive material to specific regions of the surface of the ceramic green sheets to produce layers, such as layers 607A, 607B, 607C, 607D, and 607E. The formation of reduced termination patterns, discussed above, may take place in the process 610, by the appropriate design for the electrode shapes. In the illustrated example, appropriate application of the conductive materials in layers 607A and 607B may be used to implement the cutaway regions in the termination surface (e.g., cutaway region 192 in capacitor structure 191). To that end, the electrode region 616A in layer 607A may outline a portion 650A along an edge of the layer 607A. Similarly, the electrode region 618A may outline a portion 650B along an edge of the layer 607B to form a cutaway region. By contrast, electrode regions 616B and 618B, in layers 607C, 607D, and 607E do not include any cutaway portion, as these layers may be located in regions of the capacitor structure without a cutaway region.

In some embodiments of capacitor structures with electrode density gradient, the electrode layers may have non-contiguous electrodes to implement the different gradients, such as in as capacitor structures 371 and 381. To produce these types of capacitor structures, the process 610 may be adjusted to produce the correct electrode layout, outlining regions without conductive material. In embodiments of capacitor structures showing curved termination patterns, such as in capacitor structures 131, 141, 151, and 161, each ceramic sheet may have an electrode region with a distinct cutaway portion. As such, the process 610 may adjusted to allow individual application of the conductor material to each ceramic sheet.

As discussed above, in certain embodiments, modifications to the non-metallized region, that encapsulates the metallized region, is applied. Embodiments in which this type of modification is applied include capacitor structures 411, 431, and 441. To assemble these capacitor structures, modification of layers may be used. In a process 612, the non-electrode portions of a ceramic sheet may be modified (e.g., receive a treatment) to modify physical characteristics of the non-metallized areas. For example, the non-metallized region 617A in layer 607A may receive a treatment, which may be an addition of impurities (e.g., doping, application of a coating) to adjust physical characteristics of the non-metallized region 617A.

The process 612 may include the use of masking processes (e.g., photolithography) to target the non-metallized region 617A specifically, without unintentional modification of the electrode region 616A. In some embodiments, process 612 may include replacement of the non-metallized region 617A by cutting the original region and attaching a non-metallized region 617A formed from a different material. Non-metallized regions 619A, 617B, and 619B illustrated in one of the layers 607B, 607C, 607D, and 607E, may receive similar treatment. The specific materials and treatments that may be used in process 612 to generate matched physical characteristics are detailed below.

The layers produced may be stacked and pressed in a process 620 to form a capacitor structure 622. The stack of ceramic layers may have one or more layers 616 to form a lid region (e.g., lid region 302) and one or more layers 618 to form a floor region (e.g., floor region 304) of the capacitor structure 622. The ceramic sheets that form the layers 616 and 618 may receive modifications similar to the ones received by the non-metallized regions of the body, such as non-metallized regions 617A, 617B, 619A, and 169B in process 612. In implementations of the method 600 that include modification of the substrate in the lid regions 302 and/or floor regions 304 without modifications in the non-metallized regions of the middle region 306, such as capacitor structures 401, 421, and 451, the layers 616 and/or 618 may receive modifications or may be formed from substrates that provide matching of physical characteristics with the metallized regions, as discussed above. In embodiments that employ plain ceramic sheets to provide a gradient of metallization density, such as capacitor structures 651 and 361, plain ceramic sheets may be placed between ceramic sheets having electrodes. Following the pressing of the sheets, the capacitor may be cut to the final dimensions, and the termination surface may present the desired termination pattern.

In order to produce the capacitor structures above, the body of the dielectric material may include any of the ceramic materials employed in capacitor manufacturing, including, but not limited to X5R and/or X7R ceramic materials, as classified under the Electronic Industries Alliance (EIA) Standard EIA RS-198. The electrode materials may include copper, nickel, silver, a copper alloy, a nickel alloy, or a silver alloy, among other conductors. External electrodes (e.g., electrode coating along the termination surface) may be formed using glass frits coated with nickel, copper coated with nickel or tin coated with tin, among other materials, and may or may not include intermediate conductive layers.

The materials and/or modifications in non-metallized regions may be chosen to match specific physical characteristics of the capacitor structure. For example, a thermal coefficient for the mixture of ceramic and electrode materials in a metallized region of a capacitor may be about $10.8 \times 10^{-6}/°$ C. at 350° C. and $17.5 \times 10^{-6}/°$ C. at 1050° C. Ceramic materials that form a substrate, may have a distinct thermal coefficient, as discussed above. Magnesium oxide, for example, may have a thermal coefficient of about $13.5 \times 10^{-6}/°$ C. and zirconium oxide may have a thermal coefficient of about $10.5 \times 10^{-6}/°$ C. The base thermal coefficient may be adjusted by mixture with materials, such as aluminum oxide, with thermal coefficient of about $7.6 \times 10^{-6}/°$ C., yttrium oxide with thermal coefficient of about $7.4 \times 10^{-6}/°$ C., and/or soda-lime glass with a thermal coefficient of about $9.0 \times 10^{-6}/°$ C. Moreover, compounds such as $2MgO\ SiO_2$ with thermal coefficient of about $9.9 \times 10^{-6}/°$ C. or $MgO\ SiO_2$ with thermal coefficient of about $7.7 \times 10^{-6}/°$ C. may be used. In some embodiments, application of a nickel coating and oxidation of the nickel surface may be used. Nickel oxide may have a thermal coefficient of about $13.9 \times 10^{-6}/°$ C. Manganese oxide and cobalt oxide may be formed in a similar manner, with a coating application followed by oxidation.

The embodiments described herein may have a rated voltage between 2.5V and 25V. The rated capacitance may be substantially in an interval between 5.6 μF and 220 μF. In some of the embodiments, in which knowledge of the location of the top of the capacitor may be useful (e.g., capacitor structure 151, in which the termination pattern is vertically asymmetric), an external marking in the capacitor structure to indicate the top side may be used. The external marking may employ design structures that facilitate processing by computer vision software, to facilitate use of the marked capacitors in an automated manufacturing facility.

The described capacitor structures may have floorplan dimensions that obey standards, such as EIA standard dimensions EIA 0805 (2.0×1.25 mm), EIA 0603 (1.6×0.8 mm), EIA 0402 (1.0×0.5 mm), or EIA 0201 (0.6×0.3 mm), to facilitate the design of printed circuit board design. The height of the capacitor structures may vary. In some embodiments the capacitor may have a height smaller than 0.3 mm, 0.5 mm, 0.8 mm, 1.0 mm, 1.25 mm, 1.26 mm, 1.6 mm, or 2.0 mm to facilitate design of the electrical device. Electrode strips and/or neighboring gaps may be applied (e.g., stenciled) at dimensions as small as 30 μm. The capacitors described above may have a recessed "keep out" region with a minimum dimension in a range between 20 and 50 μm.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . " it is intended that such elements are to be interpreted under 35 U.S.C. § 112(f). However, for any claims containing elements designated in any other manner, it is intended that such elements are not to be interpreted under 35 U.S.C. § 112(f).

What is claimed is:

1. A multilayer capacitor device, comprising:
 a lid region comprising a first plurality of ceramic layers, wherein each ceramic layer of the first plurality of ceramic layers comprises a first ceramic material;
 a floor region comprising a second plurality of ceramic layers, wherein each ceramic layer of the second plurality of ceramic layers comprises the first ceramic material; and
 a middle region disposed between the lid region and the floor region, wherein the middle region comprises:
  a non-metallized region having a first thermal expansion coefficient; and a metallized region having a second thermal expansion coefficient that is substantially similar to the first thermal expansion coefficient, wherein the metallized region comprises a third plurality of ceramic layers that comprise a second ceramic material that is different from the first ceramic material.

2. The multilayer capacitor device of claim 1, wherein the first ceramic material comprises a first modification of the second ceramic material, the non-metallized region of the middle region comprises the first modification, and wherein the first modification comprises a doping of the second ceramic material or an application of a coating to the second ceramic material, or both.

3. The multilayer capacitor device of claim 1, wherein each respective electrode region of each respective ceramic layer of the third plurality of ceramic layers comprise copper, nickel, silver, a copper alloy, a nickel alloy, or a silver alloy.

4. The multilayer capacitor device of claim 1, wherein the second ceramic material comprises substrate that comprises a magnesium oxide or a zirconium oxide or any combination thereof.

5. The multilayer capacitor device of claim 4, wherein the second ceramic material comprises a mixture of the substrate with an aluminum oxide, yttrium oxide, or soda-lime glass, or any combination thereof.

6. The multilayer capacitor device of claim 1, wherein the second ceramic material comprises nickel oxide, manganese oxide, or cobalt oxide, or any combination thereof.

7. The multilayer capacitor device of claim 1, wherein the middle region comprises a first termination surface configured to receive a first terminal of the multilayer capacitor device, and wherein the first termination surface comprises a termination pattern that comprises a cutaway region.

8. A multilayer capacitor device, comprising:
a plurality of ceramic layers, each respective layer comprising a respective electrode of a plurality of electrodes; and
a first termination surface configured to receive a first terminal of the multilayer capacitor device, wherein the first termination surface comprises a plurality of electrode terminations that form a termination pattern, wherein each respective electrode termination is associated with the respective electrode, and wherein the termination pattern comprises:
a first subset of electrode terminations of the plurality of electrode terminations comprising a first size;
a second subset of electrode terminations of the plurality of electrode terminations comprising a second size, wherein the first size is smaller than the second size; and
a cutaway region on the first termination surface along the first subset of electrode terminations.

9. The multilayer capacitor device of claim 8, wherein the cutaway region comprises a curved cutaway region.

10. The multilayer capacitor device of claim 9, wherein the termination pattern comprises a chalice-shaped termination pattern or a rounded pyramidal-shaped termination pattern.

11. The multilayer capacitor device of claim 8, wherein the cutaway region comprises a straight cutaway region.

12. The multilayer capacitor device of claim 11, wherein the termination pattern comprises a U-shaped termination pattern, a H-shaped termination pattern, a cross-shaped termination pattern, or a T-shaped termination pattern.

13. The multilayer capacitor device of claim 8, wherein each electrode of the plurality of electrodes comprises a respective vertical electrode, each electrode termination comprises a reduced height electrode termination, and the termination pattern comprises a reduced-height termination pattern.

14. The multilayer capacitor device of claim 8, wherein the termination pattern comprises a second cutaway region along a bottom of the multilayer capacitor device.

15. A multilayer capacitor device, comprising:
a first plurality of ceramic layers, wherein each ceramic layer of the first plurality of ceramic layers comprises a first electrode region; and
a second plurality of ceramic layers;
wherein the multilayer capacitor device comprises a stack of ceramic layers of the first plurality of ceramic layers and ceramic layers of the second plurality of ceramic layers arranged to form a metallization density gradient in the multilayer capacitor device that increases from a top of the multilayer capacitor device towards a middle of the multilayer capacitor device, wherein the middle of the multilayer capacitor device does not include any ceramic layer of the first plurality of ceramic layers.

16. The multilayer capacitor device of claim 15, wherein the stack of ceramic layers is arranged to form a second metallization density gradient in the multilayer capacitor device that increases from a bottom of the multilayer capacitor device towards the middle of the multilayer capacitor device.

17. A multilayer capacitor device, comprising:
a first plurality of ceramic layers, wherein each ceramic layer of the first plurality of ceramic layers comprises a first electrode region;
a second plurality of ceramic layers; and
wherein the multilayer capacitor device comprises a stack of ceramic layers of the first plurality of ceramic layers and ceramic layers of the second plurality of ceramic layers arranged to form a metallization density gradient in the multilayer capacitor device that increases from a top of the multilayer capacitor device towards a middle of the multilayer capacitor device, wherein each ceramic layer of a sub plurality of the second plurality of ceramic layers comprises a plurality of electrode strips.

18. The multilayer capacitor device of claim 17, wherein the stack of ceramic layers is arranged to form a crenelated pattern of electrodes along a body of the multilayer capacitor device.

19. The multilayer capacitor device of claim 8, wherein the first subset of electrode terminations is located above the second subset of electrode terminations.

20. The multilayer capacitor device of claim 8, wherein the first subset of electrode terminations are located in an upper region of the first termination surface.

* * * * *